US007978899B2

(12) United States Patent
Jenrick et al.

(10) Patent No.: US 7,978,899 B2
(45) Date of Patent: Jul. 12, 2011

(54) CURRENCY PROCESSING SYSTEM WITH FITNESS DETECTION

(75) Inventors: Charles P. Jenrick, Chicago, IL (US); Douglas U. Mennie, Barrington, IL (US); John R. Blake, St. Charles, IL (US); Matthew L. Anderson, Salem, WI (US); Gary P. Watts, Buffalo Grove, IL (US); Curtis W. Hallowell, Palatine, IL (US); Robert J. Klein, Chicago, IL (US); Jeffrey G. Knoll, Carol Stream, IL (US); Tomasz M. Jagielinski, Carlsbad, CA (US)

(73) Assignee: Cummins-Allison Corp., Mt. Prospect, IL (US)

( * ) Notice: Subject to any disclaimer, the term of this patent is extended or adjusted under 35 U.S.C. 154(b) by 1284 days.

(21) Appl. No.: 11/544,228

(22) Filed: Oct. 5, 2006

(65) Prior Publication Data

US 2007/0122023 A1 May 31, 2007

Related U.S. Application Data

(60) Provisional application No. 60/723,652, filed on Oct. 5, 2005.

(51) Int. Cl.
*G06K 9/00* (2006.01)
*B07C 5/00* (2006.01)

(52) U.S. Cl. ........................................ 382/135; 209/534

(58) Field of Classification Search ................... 382/135
See application file for complete search history.

(56) References Cited

U.S. PATENT DOCUMENTS

| | | | | |
|---|---|---|---|---|
| 3,976,198 | A * | 8/1976 | Carnes et al. | 209/534 |
| 4,787,518 | A | 11/1988 | Yuge et al. | 209/534 |
| 5,163,672 | A | 11/1992 | Mennie | 271/187 |
| 5,207,788 | A | 5/1993 | Geib | 271/122 |
| 5,295,196 | A | 3/1994 | Raterman et al. | 382/135 |

(Continued)

FOREIGN PATENT DOCUMENTS

JP 54-118138 9/1979

(Continued)

OTHER PUBLICATIONS

Third-Party Submission in a Published Application Under 37 C.F.R. § 1.99 submitted in U.S. Appl. No. 11/544,228 by Caroline D. Dennison [Reg. No. 34,494] of Roberts Mlotkowski & Hobbes P.C., McLean, Virginia, 2 pgs (Jul. 31, 2007).

(Continued)

*Primary Examiner* — Brian P Werner
*Assistant Examiner* — Nirav G Patel
(74) *Attorney, Agent, or Firm* — Nixon Peabody LLP

(57) ABSTRACT

In one aspect, a method of processing currency in a currency processing machine includes the act of retrieving, from a plurality of input currency bills, characteristic information from each of the bills, the characteristic information itself including at least a first characteristic information relating to fitness. The method also includes the act of assigning to each currency bill one of a plurality of fitness types and fitness levels relating to the first characteristic information of the bill, at least one of the fitness types and the fitness levels being defined by a user. The method also includes the act of outputting each currency bill along one of a plurality of output paths designated by the user to receive currency bills, the output path having a fitness type and/or fitness level assigned to the currency bill.

31 Claims, 9 Drawing Sheets

U.S. PATENT DOCUMENTS

| | | | | |
|---|---|---|---|---|
| 5,467,405 | A | 11/1995 | Raterman et al. | 382/135 |
| 5,467,406 | A | 11/1995 | Graves et al. | 382/135 |
| D369,984 | S | 5/1996 | Larsen | D10/97 |
| 5,615,280 | A | 3/1997 | Izawa et al. | 382/135 |
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 5,724,438 | A | 3/1998 | Graves | 382/135 |
| 5,751,840 | A | 5/1998 | Raterman et al. | 382/135 |
| 5,790,693 | A | 8/1998 | Graves et al. | 382/135 |
| 5,790,697 | A | 8/1998 | Munro et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,938,044 | A | 8/1999 | Weggesser | 209/534 |
| 5,943,655 | A | 8/1999 | Jacobson | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,026,175 | A | 2/2000 | Munro et al. | 382/135 |
| 6,028,951 | A | 2/2000 | Raterman et al. | 382/135 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,128,402 | A | 10/2000 | Jones et al. | 382/135 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,560,355 | B2 | 5/2003 | Graves et al. | 382/135 |
| 6,588,569 | B1 | 7/2003 | Hallowell et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Munro et al. | 382/135 |
| 6,798,899 | B2 | 9/2004 | Mennie et al. | 382/135 |
| 6,810,137 | B2 | 10/2004 | Jones et al. | 382/135 |
| 6,843,418 | B2 | 1/2005 | Jones et al. | 235/462.01 |
| 6,860,375 | B2 | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 * | 7/2005 | Maier et al. | 271/265.04 |
| 6,915,893 | B2 | 7/2005 | Mennie | 194/207 |
| 6,929,109 | B1 | 8/2005 | Klein et al. | 194/206 |
| 6,955,253 | B1 | 10/2005 | Mazur et al. | 194/207 |
| 6,957,733 | B2 | 10/2005 | Mazur et al. | 194/215 |
| 6,959,800 | B1 | 11/2005 | Mazur et al. | 194/207 |
| 6,962,247 | B2 | 11/2005 | Maier et al. | 194/207 |
| 6,980,684 | B1 | 12/2005 | Munro et al. | 382/135 |
| 6,994,200 | B2 | 2/2006 | Jenrick et al. | 194/206 |
| 6,996,263 | B2 | 2/2006 | Jones et al. | 382/135 |
| 7,000,828 | B2 | 2/2006 | Jones | 235/379 |
| 7,016,767 | B2 | 3/2006 | Jones et al. | 700/224 |
| 7,082,216 | B2 | 7/2006 | Jones et al. | 382/137 |
| 7,092,560 | B2 | 8/2006 | Jones et al. | 382/135 |
| 7,103,206 | B2 | 9/2006 | Graves et al. | 382/135 |
| 7,103,438 | B2 | 9/2006 | Hallowell et al. | 700/116 |
| 7,146,245 | B2 | 12/2006 | Jones et al. | 700/224 |
| 7,149,336 | B2 * | 12/2006 | Jones et al. | 382/135 |
| 7,158,662 | B2 | 1/2007 | Chiles | 382/135 |
| 7,171,032 | B2 | 1/2007 | Jones et al. | 382/135 |
| 7,187,795 | B2 | 3/2007 | Jones et al. | 382/135 |
| 7,191,657 | B2 | 3/2007 | Maier et al. | 73/587 |
| 7,197,173 | B2 | 3/2007 | Jones et al. | 382/135 |
| 7,200,255 | B2 | 4/2007 | Jones et al. | 382/135 |
| 7,201,320 | B2 | 4/2007 | Csulits et al. | 235/462.01 |
| 7,232,024 | B2 | 6/2007 | Mazur et al. | 194/207 |
| 7,248,731 | B2 | 7/2007 | Raterman et al. | 382/135 |
| 7,256,874 | B2 | 8/2007 | Csulits et al. | 356/71 |
| 7,269,279 | B2 | 9/2007 | Chiles | 382/135 |
| 2001/0006557 | A1 | 7/2001 | Mennie et al. | 382/135 |
| 2001/0015311 | A1 | 8/2001 | Mennie | 194/207 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/100 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 358/498 |
| 2002/0085745 | A1 | 7/2002 | Jones et al. | 382/135 |
| 2002/0103757 | A1 | 8/2002 | Jones et al. | 705/45 |
| 2002/0104785 | A1 | 8/2002 | Klein et al. | 209/534 |
| 2002/0107801 | A1 | 8/2002 | Jones et al. | 705/45 |
| 2002/0118871 | A1 | 8/2002 | Jones et al. | 382/137 |
| 2002/0122580 | A1 | 9/2002 | Jones et al. | 382/137 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/137 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |
| 2003/0009420 | A1 | 1/2003 | Jones | 705/39 |
| 2003/0015395 | A1 * | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |
| 2003/0198373 | A1 | 10/2003 | Raterman et al. | 382/135 |
| 2003/0202690 | A1 | 10/2003 | Jones et al. | 382/139 |

| | | | | |
|---|---|---|---|---|
| 2004/0003980 | A1 | 1/2004 | Hallowell et al. | 194/206 |
| 2004/0016621 | A1 | 1/2004 | Jenrick et al. | 194/206 |
| 2004/0016797 | A1 | 1/2004 | Jones et al. | 235/379 |
| 2004/0028266 | A1* | 2/2004 | Jones et al. | 382/135 |
| 2004/0083149 | A1 | 4/2004 | Jones | 705/35 |
| 2004/0145726 | A1 | 7/2004 | Csulits et al. | 356/71 |
| 2004/0149538 | A1 | 8/2004 | Sakowski | 194/207 |
| 2004/0153408 | A1 | 8/2004 | Jones et al. | 705/43 |
| 2004/0154964 | A1 | 8/2004 | Jones | 209/534 |
| 2004/0173432 | A1 | 9/2004 | Jones | 194/216 |
| 2004/0251110 | A1 | 12/2004 | Jenrick et al. | 194/207 |
| 2005/0029168 | A1* | 2/2005 | Jones et al. | 209/534 |
| 2005/0035034 | A1 | 2/2005 | Long et al. | 209/534 |
| 2005/0040225 | A1 | 2/2005 | Csulits et al. | 235/379 |
| 2005/0047642 | A1 | 3/2005 | Jones et al. | 382/137 |
| 2005/0060055 | A1 | 3/2005 | Hallowell et al. | 700/95 |
| 2005/0060059 | A1 | 3/2005 | Klein et al. | 700/213 |
| 2005/0060061 | A1 | 3/2005 | Jones | 700/226 |
| 2005/0077142 | A1 | 4/2005 | Tam et al. | 194/217 |
| 2005/0086271 | A1 | 4/2005 | Jones et al. | 707/200 |
| 2005/0087422 | A1 | 4/2005 | Maier et al. | 194/207 |
| 2005/0108165 | A1 | 5/2005 | Jones et al. | 705/43 |
| 2005/0117791 | A2 | 6/2005 | Raterman et al. | 382/135 |
| 2005/0117792 | A2 | 6/2005 | Graves et al. | 382/135 |
| 2005/0150738 | A1* | 7/2005 | Hallowell et al. | 194/206 |
| 2005/0163361 | A1 | 7/2005 | Jones et al. | 382/135 |
| 2005/0163362 | A1 | 7/2005 | Jones et al. | 382/137 |
| 2005/0169511 | A1 | 8/2005 | Jones | 382/135 |
| 2005/0173221 | A1 | 8/2005 | Maier et al. | 194/207 |
| 2005/0183928 | A1 | 8/2005 | Jones et al. | 194/207 |
| 2005/0207634 | A1 | 9/2005 | Jones et al. | 382/135 |
| 2005/0213803 | A1 | 9/2005 | Mennie et al. | 382/135 |
| 2005/0241909 | A1 | 11/2005 | Mazur et al. | 194/207 |
| 2005/0249394 | A1 | 11/2005 | Jones et al. | 382/135 |
| 2005/0265591 | A1 | 12/2005 | Jones et al. | 382/135 |
| 2005/0276458 | A1 | 12/2005 | Jones et al. | 382/135 |
| 2005/0278239 | A1 | 12/2005 | Jones et al. | 705/35 |
| 2006/0010071 | A1 | 1/2006 | Jones et al. | 705/42 |
| 2006/0054455 | A1 | 3/2006 | Kuykendall et al. | 194/217 |
| 2006/0078186 | A1 | 4/2006 | Freeman et al. | 382/135 |
| 2006/0157390 | A1* | 7/2006 | Otsuka | 209/534 |
| 2006/0182330 | A1 | 8/2006 | Chiles | 382/135 |
| 2006/0195567 | A1 | 8/2006 | Mody et al. | 709/224 |
| 2006/0210137 | A1 | 9/2006 | Raterman et al. | 382/135 |
| 2006/0274929 | A1 | 12/2006 | Jones et al. | 382/135 |
| 2007/0000819 | A1 | 1/2007 | Yui | 209/534 |
| 2007/0076939 | A1 | 4/2007 | Jones et al. | 382/135 |
| 2007/0078560 | A1 | 4/2007 | Jones et al. | 700/224 |
| 2007/0095630 | A1 | 5/2007 | Mennie et al. | 194/206 |
| 2007/0112674 | A1 | 5/2007 | Jones et al. | 705/45 |
| 2007/0122023 | A1 | 5/2007 | Jenrick et al. | 382/135 |
| 2007/0172107 | A1 | 7/2007 | Jones et al. | 382/137 |

FOREIGN PATENT DOCUMENTS

| | | | |
|---|---|---|---|
| JP | 59-130581 | | 7/1984 |
| JP | 62-163195 | | 7/1987 |
| JP | 3-188592 | | 8/1991 |
| WO | WO 91/11778 | | 8/1991 |
| WO | WO 92/17394 | | 10/1992 |
| WO | WO 93/23824 | | 11/1993 |
| WO | WO 95/24691 | | 9/1995 |
| WO | WO 96/10800 | | 4/1996 |
| WO | WO 96/36933 | | 11/1996 |
| WO | WO 97/30422 | | 8/1997 |
| WO | WO 97/43734 | | 11/1997 |
| WO | WO 97/45810 | | 12/1997 |
| WO | WO 98/12662 | | 3/1998 |
| WO | WO 98/13785 | | 4/1998 |
| WO | WO 98/24052 | | 6/1998 |
| WO | WO 98/24067 | | 6/1998 |
| WO | WO 98/35323 | | 8/1998 |
| WO | WO 98/40839 | | 9/1998 |
| WO | WO 98/47100 | | 10/1998 |
| WO | WO 98/50892 | | 11/1998 |
| WO | WO 98/59323 | | 12/1998 |
| WO | WO 99/09511 | | 2/1999 |
| WO | WO 99/14668 | | 3/1999 |
| WO | WO 99/23601 | | 5/1999 |
| WO | WO 99/41695 | | 8/1999 |
| WO | WO 99/48040 | | 9/1999 |
| WO | WO 99/48042 | | 9/1999 |
| WO | WO 00/24572 | | 5/2000 |
| WO | WO 01/08108 | | 2/2001 |
| WO | WO 01/59685 | | 8/2001 |
| WO | WO 01/59723 | | 8/2001 |
| WO | WO 02/29735 | | 4/2002 |
| WO | WO 02/054360 | | 7/2002 |
| WO | WO 03/005312 | | 1/2003 |
| WO | WO 03/028361 | | 4/2003 |
| WO | WO 03/029913 | | 4/2003 |
| WO | WO 03/030113 | | 4/2003 |
| WO | WO 03/067532 | | 8/2003 |
| WO | WO 03/107282 | | 12/2003 |
| WO | WO 2004/010367 | | 1/2004 |
| WO | WO 2004/027717 | | 4/2004 |
| WO | WO 2004/036508 | | 4/2004 |
| WO | WO 2004/038631 | | 5/2004 |
| WO | WO 2004/068422 | | 8/2004 |
| WO | WO 2005/013209 | A2 | 2/2005 |
| WO | WO 2005/017842 | A1 | 2/2005 |
| WO | WO 2005/028348 | A2 | 3/2005 |
| WO | WO 2005/029240 | A2 | 3/2005 |
| WO | WO 2005/036445 | A1 | 4/2005 |
| WO | WO 2005/076229 | A1 | 8/2005 |
| WO | WO 2005/118443 | | 12/2005 |
| WO | WO 2006/039439 | A2 | 4/2006 |
| WO | WO 2006/076289 | A2 | 7/2006 |
| WO | WO 2006/076634 | A2 | 7/2006 |

OTHER PUBLICATIONS

Search Report for PCT/US2006/039234 which claims priority to U.S. Appl. No. 60/723,652, 5 pages, (Jun. 12, 2007).

Written Opinion for PCT/US2006/039234 which claims priority to U.S. Appl. No. 60/723,652, 7 pages, (Jun. 12, 2007).

* cited by examiner

| LEVEL | GRADE | DEFECTS | | | |
|---|---|---|---|---|---|
| | | SOIL (Soilage Area) | TEARS (Total Tear Depth Along Long Edges) | HOLES (Total Area Of Hole(s)) | LIMPNESS (Based On Detector Output Voltage) |
| 1 | MINT | No detectable soil | No detectable tears | No detectable holes | Output greater than or equal to 1.50 V |
| 1 | GRADE A | Between 0 $mm^2$ - 1 $mm^2$ | Between 0 mm - 1 mm | Between 0 $mm^2$ - 1 $mm^2$ | Output greater than or equal to 1.25 V |
| 2 | GRADE B | Between 1 $mm^2$ - 3 $mm^2$ | Between 1 mm - 3 mm | Between 1 $mm^2$ - 10 $mm^2$ | Output greater than or equal to 1.00 V |
| 2 | GRADE C | Between 3 $mm^2$ – 6 $mm^2$ | Between 3 mm – 6 mm | Between 10 $mm^2$ – 19 $mm^2$ | Output greater than or equal to 0.75 V |
| 3 | GRADE D | Greater than or equal to 6 $mm^2$ | Greater than or equal to 6 mm | Greater than or equal to 19 $mm^2$ | Output less than 0.75 V |

FIG. 2(a)

| GRADE | DEFECTS | | | |
|---|---|---|---|---|
| | SOIL<br><br>(Soilage Area) | TEARS<br><br>(Total Tear Depth Along Long Edges) | HOLES<br><br>(Total Area Of Hole(s)) | LIMPNESS<br><br>(Based On Detector Output Voltage) |
| MINT | Level 1 | Level 1 | Level 1 | Level 1 |
| GRADE A | Level 1<br>Level 2 | Level 1 | Level 1<br>Level 2 | Level 1<br>Level 2 |
| GRADE B | Level 2 | Level 2 | Level 2 | Level 2 |
| GRADE C | Level 3 | Level 3 | Level 3 | Level 2 |
| GRADE D | Level 3 | Level 3 | Level 3 | Level 3 |

FIG. 2(b)

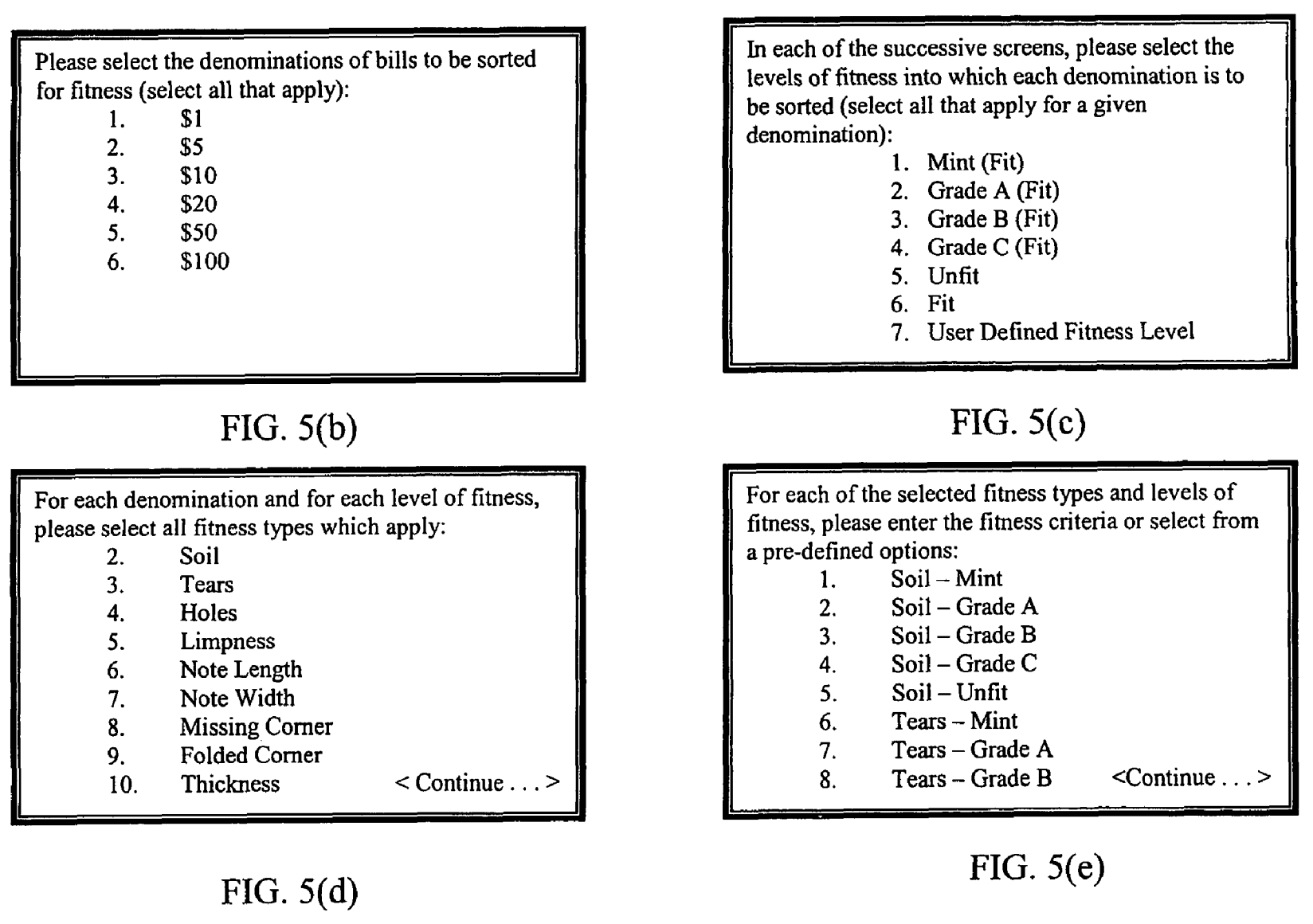

Please select the denominations of bills to be sorted for fitness (select all that apply):

1. $1
2. $5
3. $10
4. $20
5. $50
6. $100

FIG. 5(b)

In each of the successive screens, please select the levels of fitness into which each denomination is to be sorted (select all that apply for a given denomination):

1. Mint (Fit)
2. Grade A (Fit)
3. Grade B (Fit)
4. Grade C (Fit)
5. Unfit
6. Fit
7. User Defined Fitness Level

FIG. 5(c)

For each denomination and for each level of fitness, please select all fitness types which apply:

2. Soil
3. Tears
4. Holes
5. Limpness
6. Note Length
7. Note Width
8. Missing Corner
9. Folded Corner
10. Thickness < Continue . . . >

FIG. 5(d)

For each of the selected fitness types and levels of fitness, please enter the fitness criteria or select from a pre-defined options:

1. Soil – Mint
2. Soil – Grade A
3. Soil – Grade B
4. Soil – Grade C
5. Soil – Unfit
6. Tears – Mint
7. Tears – Grade A
8. Tears – Grade B <Continue . . . >

FIG. 5(e)

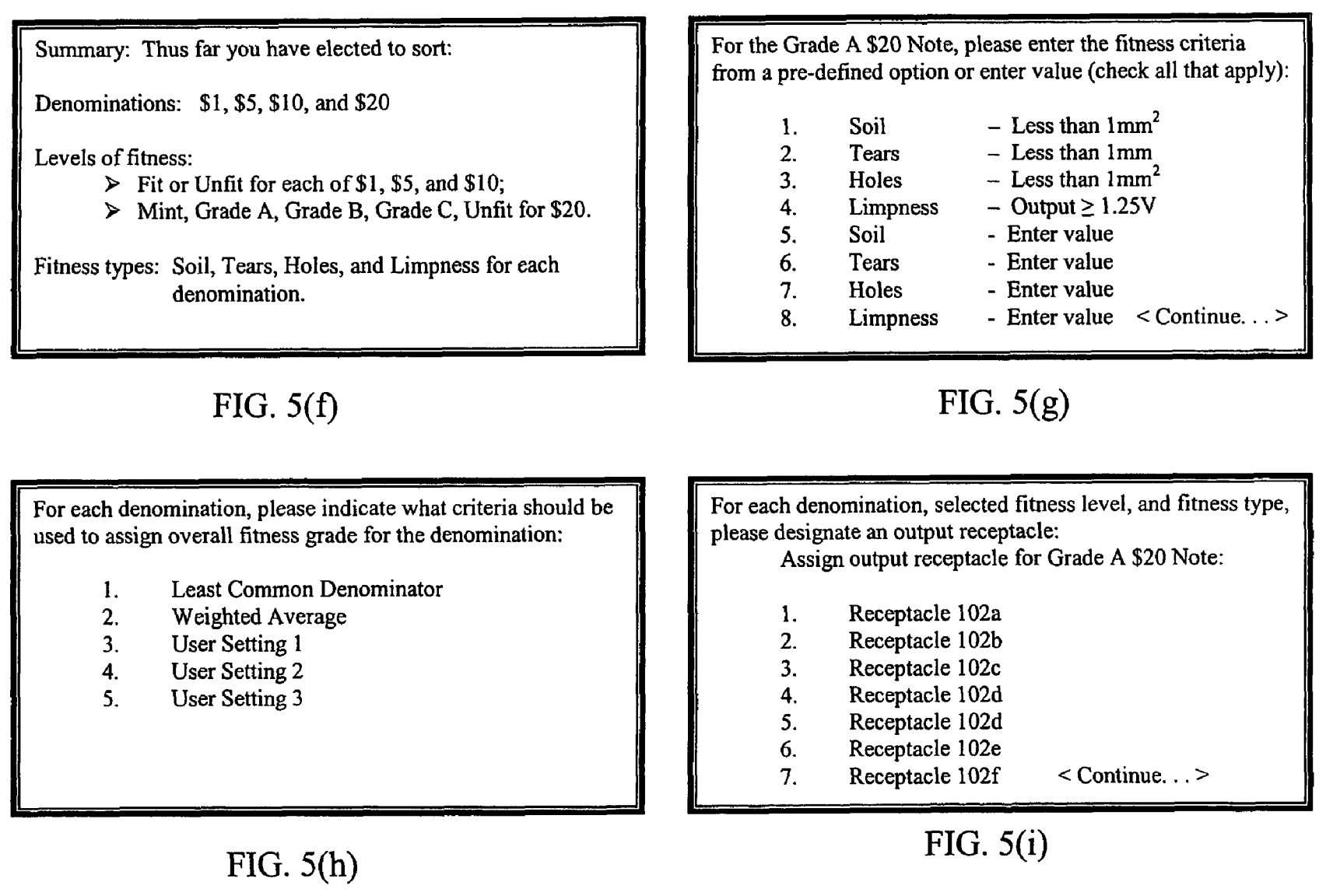

Summary: Thus far you have elected to sort:

Denominations: $1, $5, $10, and $20

Levels of fitness:
- Fit or Unfit for each of $1, $5, and $10;
- Mint, Grade A, Grade B, Grade C, Unfit for $20.

Fitness types: Soil, Tears, Holes, and Limpness for each denomination.

FIG. 5(f)

For the Grade A $20 Note, please enter the fitness criteria from a pre-defined option or enter value (check all that apply):

1. Soil – Less than $1mm^2$
2. Tears – Less than 1mm
3. Holes – Less than $1mm^2$
4. Limpness – Output ≥ 1.25V
5. Soil - Enter value
6. Tears - Enter value
7. Holes - Enter value
8. Limpness - Enter value < Continue. . . >

FIG. 5(g)

For each denomination, please indicate what criteria should be used to assign overall fitness grade for the denomination:

1. Least Common Denominator
2. Weighted Average
3. User Setting 1
4. User Setting 2
5. User Setting 3

FIG. 5(h)

For each denomination, selected fitness level, and fitness type, please designate an output receptacle:

Assign output receptacle for Grade A $20 Note:

1. Receptacle 102a
2. Receptacle 102b
3. Receptacle 102c
4. Receptacle 102d
5. Receptacle 102d
6. Receptacle 102e
7. Receptacle 102f < Continue. . . >

FIG. 5(i)

CURRENCY PROCESSING SYSTEM WITH FITNESS DETECTION

CROSS-REFERENCE TO RELATED APPLICATION

This application claims the benefit of U.S. Provisional Patent Application No. 60/723,652, entitled "Currency Processing System With Fitness Detection," which was filed on Oct. 5, 2005, and which is incorporated herein by reference in its entirety.

FIELD OF THE INVENTION

The present invention relates generally to the field of currency handling systems and, more particularly, to methods and devices for determining the fitness of currency bills or other conditions of the bills, as well as for methods and devices for processing, packaging, and tracking both fit and unfit bills.

BACKGROUND OF THE INVENTION

A variety of techniques and apparatuses have been used to satisfy the requirements of automated currency processing. As the number of businesses that deal with large quantities of paper currency grow, such as banks, casinos and armored carriers, these businesses are continually requiring not only that their currency be processed more quickly but, also, processed with greater accuracy and with more efficiency.

Commonly, in the processing of currency at a bank, for example, cash deposits are first received and verified by a bank teller. The cash deposit is later sorted according to denomination. Finally, the sorted bills are bundled or strapped in stacks of a predetermined number of bills (often one hundred bills).

Select bills are often removed from circulation based on minimum bill fitness criteria established by the Federal Reserve, such as that set forth in Operating Circular No. 2, dated Jan. 8, 1998, and "Fitness Standards For Federal Reserve Notes," promulgated by the Currency Technology Office of the Federal Reserve on Jul. 22, 2004. Fitness is one factor for determining if a bill should be taken out of circulation. The Federal Reserve requires that deposits of currency must be in bundles of 1,000 notes of the same denomination in ten equal straps of 100 notes and the depositing banks are further required to piece count, verify authenticity, and assemble fit, unfit, and non-machinable currency prior to deposit. Banks are not credited the amount of the deposit until accepted by the Federal Reserve and the credit is subject to any difference, counterfeit, or other irregularity detected when the deposit is verified by the Federal Reserve.

SUMMARY OF THE INVENTION

The invention is generally directed to a currency processing device comprising fitness detection capabilities and methods related thereto configured to permit variability in sorting and/or packaging capabilities and to optionally permit tracking of individual bills processed thereby. In at least some aspects, the currency processing device is a user-configurable currency processing device configured to permit an authorized user to alter various settings. For example, in such a user-configurable currency processing device, the user may permitted to alter fitness detection settings, fitness detection routines, fitness detection characteristics, fitness detection outputs, and/or any characteristics of any other system which may be related or tangentially related to fitness detection (e.g., the user may set the currency processing device to reduce a transport speed responsive to a particular condition).

In one embodiment, a currency processing device includes an input receptacle adapted to receive input currency bills, a reading device adapted to retrieve at least a first characteristic information relating to fitness and a second characteristic information from each of the currency bills, and a transport mechanism adapted to serially transport the currency bills from the input receptacle to the reading device and then to transport individual ones of the bills to a designated one of a plurality of output receptacles. A memory device is provided to store user-definitions and/or user settings for at least the first characteristic information. An input/output (I/O) device configured at least to receive a user input is also provided. A processor is further provided to process the characteristic information retrieved for each of the currency bills by the reading device and assign the currency bill to a category defined by a user to correspond to the processed characteristic information. A controller is also provided to discharge each currency bill from the transport mechanism to another transport mechanism and/or an output receptacle designated by a user to receive that category of currency bills.

In another embodiment, a method of processing currency in a currency processing machine includes the act of retrieving, from a plurality of input currency bills, characteristic information from each of the bills, the characteristic information itself including at least a first characteristic information relating to fitness (e.g., such as soiled, torn, having holes, excessive ink wear, folded corners, etc.). The method also includes the act of assigning to each currency bill one of a plurality of fitness types and fitness levels relating to the first characteristic information of the bill, at least one of the fitness types and the fitness levels (i.e., the fitness type(s) and/or fitness level(s)) being defined by a user. In some embodiments, the method also includes the act of outputting each currency bill along one of a plurality of output paths designated by the user to receive currency bills, the output path having a fitness type and/or fitness level assigned to the currency bill.

In yet another embodiment, a method for tracking currency includes the acts of processing a plurality of bills to determine fitness and retrieving, from the plurality of processed bills, characteristic information from each of the bills, the characteristic information comprising at least a first characteristic information relating to a bill fitness and a second characteristic relating to a bill serial number. The method of tracking currency further includes the acts of assigning the first characteristic information to one of a plurality of levels of the bill fitness defect selected by a user and comparing the second characteristic information to a stored plurality of related characteristic information from a database of processed bills.

The above summary of the present invention is not intended to represent each embodiment, or every aspect, of the present invention. Additional features and benefits of the present invention will become apparent from the detailed description, figures, and claims set forth below.

Other objects and advantages of the invention will become apparent upon reading the following detailed description in conjunction with the drawings.

BRIEF DESCRIPTION OF THE DRAWINGS

FIGS. 2(*a*)-2(*b*) depict examples of user-definable fitness settings in accord with at least some aspects of the present concepts.

Figure 1A:
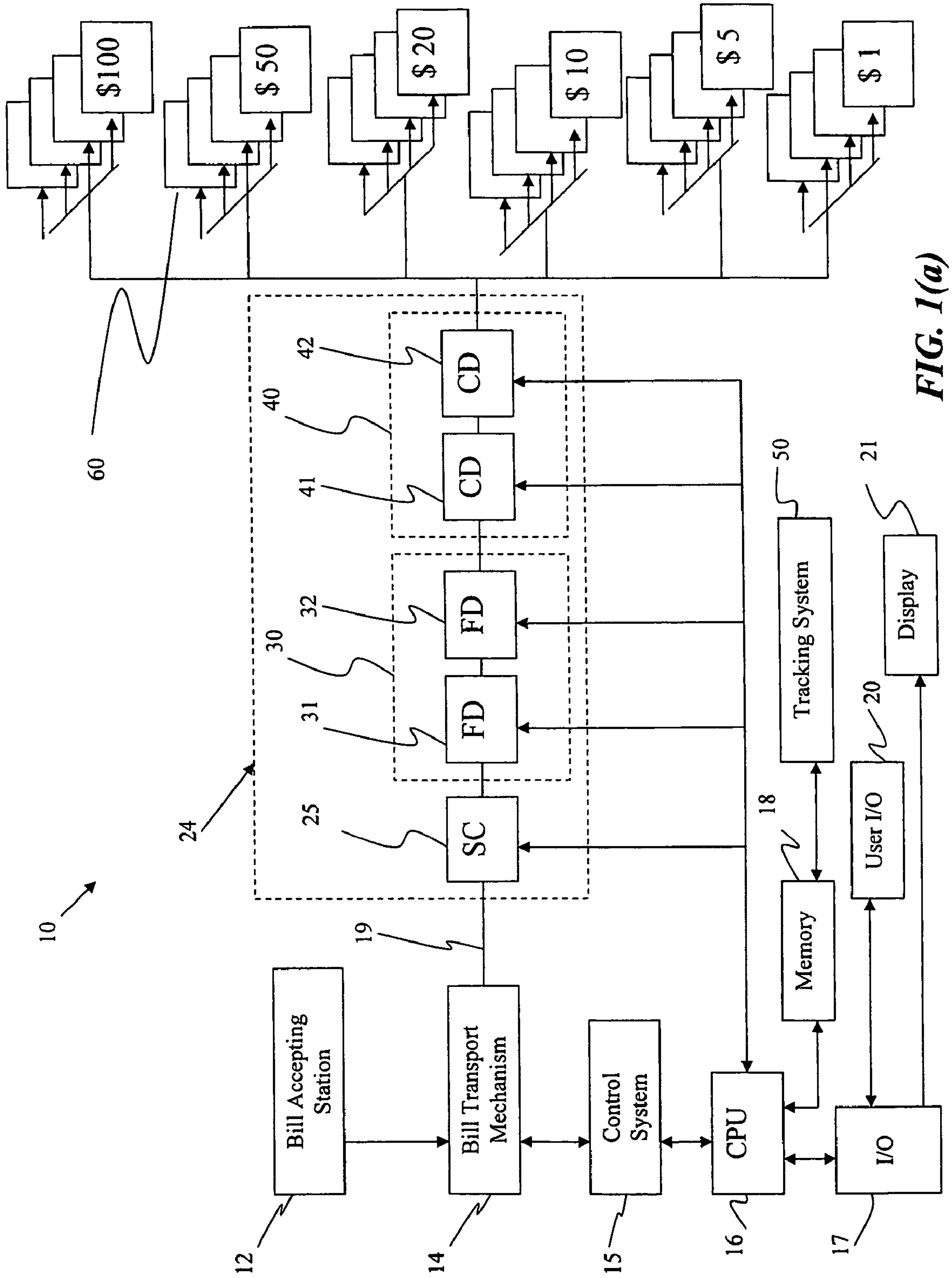
FIGS. 1(*a*)-(*b*) are block diagrams illustrating examples of currency processing systems according to at least some aspects of the present concepts.

While the present concepts are susceptible to various modifications and alternative forms, specific embodiments have been shown by way of example in the drawings and will be described in detail herein. It should be understood, however, that the present concepts are not intended to be limited to the particular forms disclosed. Rather, the present concepts are to cover all modifications, equivalents, and alternatives falling within the spirit and scope of the present concepts as defined by the appended claims.

DETAILED DESCRIPTION OF THE ILLUSTRATED EMBODIMENTS

Figure 1B:
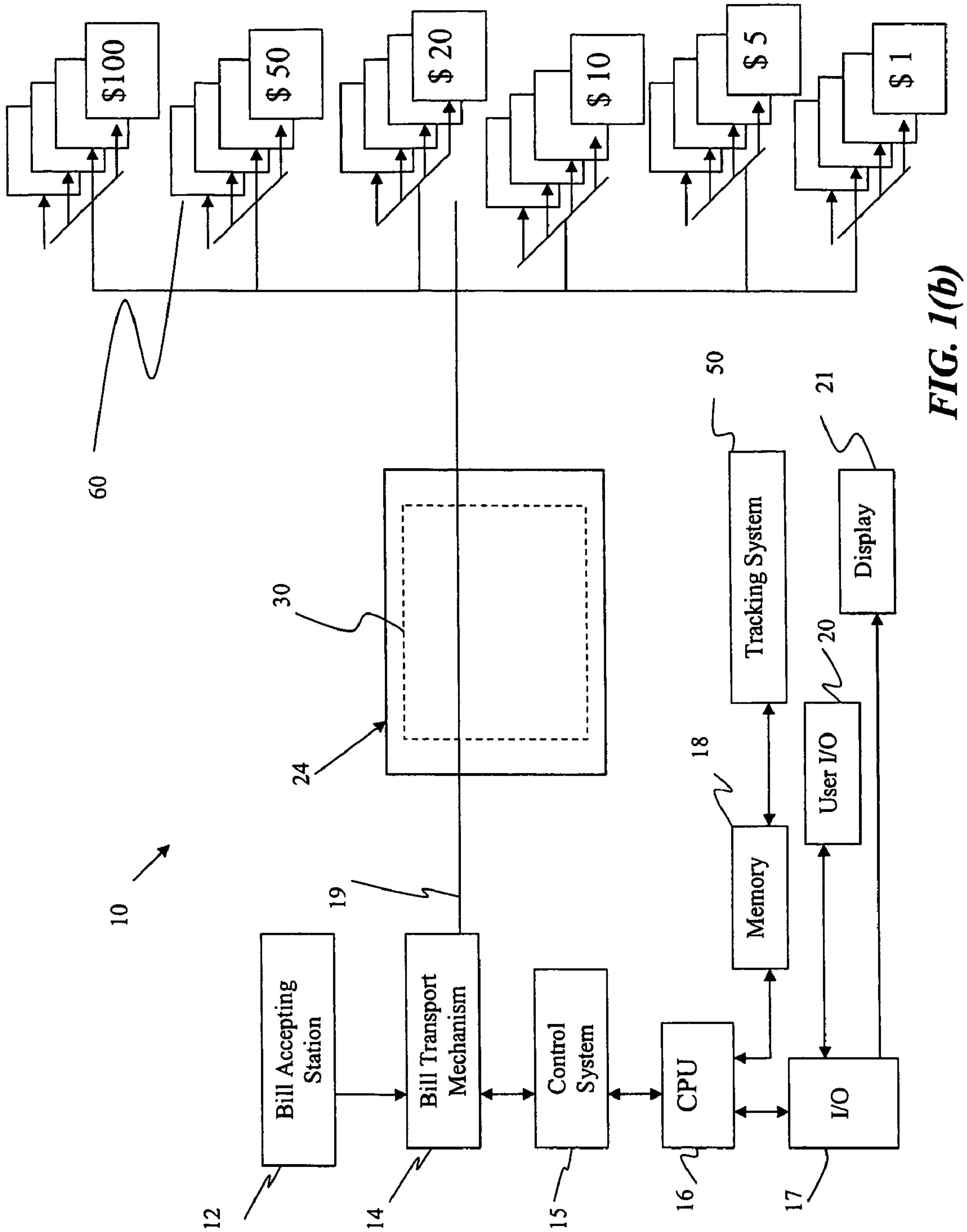

FIGS. 1(*a*)-(*b*) show functional block diagrams illustrating a currency processing system 10 according to at least some aspects of embodiments of the present concepts. The system 10 includes a bill accepting station 12 where stacks of currency bills that need to be identified, authenticated, and/or counted are positioned. Bills are picked out or separated, one bill at a time, from the accepting station 12 and sequentially relayed by a bill transport mechanism 14, along a transport path 19, and to a reading device 24.

In the embodiment depicted in FIG. 1(*a*), the reading device 24 comprises a first station 25 having one or more detectors (e.g., an optical scanhead) to identify the denomination and/or series of the respective bills, and a subsequent second station 30 and third station 40, respectively, having one or more detectors to evaluate the fitness and/or authenticity of the bills. Following processing in the first, second, and third stations 25, 30, 40, a bill is passed to a specified pocket or receptacle amongst a plurality of pockets 60, the specified pocket corresponding not only to the particular denomination of the bill, but also to a control system instruction or program input by a user, which characterizes the fitness and authenticity of the bill. The reading device 24 may comprise a unitary device (i.e., a single device or station) or may comprise a plurality of disparate devices used sequentially, such as shown in the example of FIG. 1, or even a plurality of devices used simultaneously in combination. According to at least some embodiments, a transport speed of the bills, and a corresponding processing speed, may be set to any transport speed between about 800 bills per minute (bpm) and 1600 bpm (e.g., 1000 bpm, 1200 bpm, 1500 bpm, 1600 bpm), although higher and lower transport speeds are certainly within the present concepts (e.g., 200 bpm, 1800 bpm, 2400 bpm, etc.)

The currency processing system 10 shown in FIG. 1(*a*) includes denomination discrimination, fitness, and authentication detectors in the first, second, and third stations 25, 30, 40, respectively, and is adapted as a currency discriminator as heretofore described. Nevertheless, it will be appreciated that the system 10 shown in FIG. 1(*a*) may optionally omit the first station 25 such as where the denomination and/or series of the respective bills is already known (e.g., the machine is used to pass only a single denomination) or is not required, or omit the second station 30 or third station 40 where either the fitness or authenticity does not require determination, such as is shown in the example of FIG. 1(*b*). In FIG. 1(*b*), the reading device 24 comprises only a fitness detector 30, as described herein.

In the illustrated embodiment of FIG. 1(*a*), the first station 25 may comprise one or more detectors which detect one or more types of characteristic information of a bill. According to some embodiments, detectors may be configured to detect an intensity of reflected light and/or a color. A plurality of detectors may also be used in parallel or in combination. One example of a detection scheme is disclosed in U.S. Pat. No. 4,992,825, which is incorporated herein by reference in its entirety. The first station 25 comprises, in one aspect of the present concepts, an optical detector with at least one light source directing light downwardly onto the bill transport path so as to illuminate a substantially rectangular light strip upon a currency bill positioned on the transport path below the detector. Light reflected off the illuminated strip is sensed by a photodetector positioned above the strip and the analog output of the photodetector is converted into a digital signal by means of an analog-to-digital (ADC) convertor unit whose output is fed as a digital input to a central processing unit (CPU) 16.

The detector in the first station 25 may comprise, for example, a scanhead or scanheads employing a variety of detection means such as, but not limited to, magnetic or optical sensors. For example, a variety of currency characteristics can be measured using magnetic sensing. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,257), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,314, 473). With regard to optical sensing, a variety of currency characteristics can be measured such as detection of density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,257) and holes (U.S. Pat. No. 4,381,447), and other patterns of reflectance and transmission (U.S. Pat. Nos. 3,496,370; 3,679,314; 3,870,629; 4,179,685). Color detection techniques may employ color filters, colored lamps, and/or dichroic beamsplitters (U.S. Pat. Nos. 4,841,358; 4,658, 289; 4,716,414; 4,825,246, 4,992,825 and EP 325,364). An optical sensing system may, for example, use ultraviolet light (U.S. Pat. No. 5,640,463) and/or infrared light. Each of the aforementioned patents is hereby incorporated herein by reference in its entirety.

In addition to magnetic and optical sensing, other techniques of detecting characteristic information of currency include electrical conductivity sensing, capacitive sensing (U.S. Pat. No. 5,122,713 [watermark, security thread]; U.S. Pat. No. 3,764,899 [thickness]; U.S. Pat. No. 3,815,021 [dielectric properties]; U.S. Pat. No. 5,151,257 [security thread]), and mechanical sensing (U.S. Pat. No. 4,381,447 [limpness]; U.S. Pat. No. 4,255,651 [thickness]). Each of the aforementioned patents is hereby incorporated herein by reference in its entirety.

Likewise, the denominating, sorting, filtering and/or authenticating tools and techniques used in various commercial currency processing machines such as those of Cummins, DeLaRue, Glory, Giesecke & Devrient, or others, may be employed in conjunction with the present concepts.

In the currency processing system 10 of FIG. 1, the bill transport path may be defined in such a way that the transport mechanism 14 moves currency bills with the narrow dimension of the bills parallel to the transport path and the scan direction. Alternatively, the transport mechanism 14 may be configured to move currency bills with the long dimension of the bills parallel to the transport path and the scan direction. The scan direction is not necessarily dependent upon the orientation of the currency bill. As a currency bill moves on the transport path 19 adjacent the first station 25 detector(s), the detector functions to detect or sense a characteristic of the bill (e.g., denomination) positioned in a preferred orientation relative to the detector. According to some embodiments, variations in reflected light from a narrow dimension of the bills permits distinguishing, with a high degree of confidence, currencies of varying denomination. The analog signals output by the first station 25 detector are output to an ADC and then to CPU 16 for processing. One example of the use of such reflected light data to distinguish features between characteristic patterns for different currency denominations and/or series is disclosed in U.S. Pat. No. 5,295,196, incorporated herein by reference in its entirety.

In order to ensure strict correspondence between reflectance samples obtained by narrow dimension scanning of successive bills, the initiation of the reflectance sampling process is preferably controlled through the CPU 16 by means of an control system 15 linked to the bill transport mechanism 14. The control system may comprise, according to some embodiments, an optical encoder 15 which tracks a degree of movement of a drive member and, hence, is able to provide the CPU 16 with information indicative of a corresponding position of each transported bill, such as shown in U.S. Pat. No. 5,295,196, incorporated herein by reference in its entirety.

Fit currency is generally defined by the Federal Reserve as a bill (note) that is suitable for continued circulation and is sufficiently clean to allow its genuineness and denomination to be readily ascertained. Likewise, unfit currency is generally defined by the Federal Reserve to be a bill (note) that is not suitable for further circulation because of its physical condition, such as being torn, dirty, limp, worn or defaced.

For example, the Federal Reserve has currently stated that a U.S. bill is considered unfit for redistribution if it has a length less than 151 mm (with greater than 50% of the note present) or a width less than 63 mm (with greater than 50% of the note present). A U.S. bill is considered unfit for redistribution if it has a total area of holes greater than 19 $mm^2$, which includes open tears on the short edges, the hole areas being additive. A U.S. bill is further considered unfit for redistribution if it has a total tear depth greater than 6 mm, along the long edges or tears with a minimum length of 3 mm and a minimum width of 2 mm, the tear depths being additive.

The Federal Reserve further considers a U.S. bill to be unfit for redistribution if it has one or more missing corners greater than 72 $mm^2$, missing corners with a minimum area of 26 $mm^2$ and a minimum horizontal or vertical dimension of 5 mm, at least one folded corner >182 $mm^2$, 4 folded corners regardless of area, or folded corners with a minimum area of 26 $mm^2$ and a minimum horizontal or vertical dimension of 5 mm. A U.S. bill is also considered unfit for redistribution if it has a tape length greater than 9 mm, with a minimum thickness of 0.05 mm along the long dimension of the note.

A fitness detector 30 may therefore be adapted to detect any number of predetermined conditions of the bill including, but not limited to, thickness, limpness, dirtiness, holes, tears, tape, staples, graffiti, ink wear, torn corners, folded corners, paper clips and/or other criteria for making a determination concerning the bill, as generally noted below.

Thickness detection may be accomplished using a variety of devices and methods. According to some embodiments, discussed below, thickness detection may be accomplished by using opposing rollers to measure displacement. An example of thickness detection is disclosed in co-pending U.S. application Ser. No. 10/379,365, filed Mar. 4, 2003 to Ken Maier et al., which is incorporated herein by reference in its entirety. Alternative devices and methods for measuring thickness include capacitance thickness detectors, ultrasound thickness detectors, reflected and/or transmitted light measurement detectors (e.g., lasers, IR light, UV light, visible light, etc.) suitable to detect one or more particular wavelengths of light, capacitance array detectors, overall transparency detection. These, or other, devices could be used over an entirety of the currency bill or other document, or only on a selected portion or portions thereof.

An example of limpness detection is also disclosed in co-pending U.S. application Ser. No. 10/379,365, filed Mar. 4, 2003 to Ken Maier et al., which is incorporated herein by reference in its entirety.

Fitness detector 30 could also be adapted to detect the presence or absence of one or more inks and to detect characteristics of inks on the bills. For example, fitness detector 30 could be used to detect graffiti or ink stains, such as by identification of both marks that have high contrast, such as dark ink on white areas of the bills, or by markings that have a low contrast, such as markings in dark ink on the portrait area. If the location or extent of the graffiti or ink stain exceeds a threshold, the bill may be deemed unfit. The fitness detector could optionally characterize the ink, such as to identify characteristics of particular inks used in national currencies, the presence or absence of security inks (e.g., detonated ink charges placed in money bags during a robbery), or degradation of the ink (e.g., ink wear). Sensors for such forms of ink and graffiti detection could include, for example, conventional sensors for detecting reflected and/or transmitted visible light, reflected and/or transmitted multiple wavelength light, reflected and/or transmitted light of a specified wavelength or range(s) of wavelengths, and graphite detection.

The fitness detector 30 could also be adapted to detect soiling through sensors adapted to detect reflected color, transmitted color, reflected black and white, or transmitted black and white. An example of soil detection is disclosed in co-pending U.S. application Ser. No. 10/379,365, filed Mar. 4, 2003 to Ken Maier et al., incorporated herein by reference in its entirety. Fitness detector 30 could even be configured to detect small amounts of foreign substances such as, but not limited to, food, bleach, drugs, blood, biological agents, chemicals, bacteria, explosives or gases indicative thereof. Fitness detector 30 could further be adapted to detect geometric or volumetric characteristics including, but not limited to, bill size and/or weight discrepancies, edge wear deterioration, edge wear distortion, bill transparency, and printing defects or errors (e.g., registration, printing clarity, overall print quality). Still further, the fitness detector 30 could be configured to detect holes, tears and/or missing corners through the use of one or more sensors configured to detect transmitted and/or reflected visible light, transmitted and/or reflected IR or multi-frequency IR light, transmitted and/or reflected UV or multi-frequency UV light. Additionally or alternatively, capacitive sensors could be used to measure the overall mass of the document or air pressure or vacuum sensors could be employed to measure how much air passes through a bill.

Fitness detector 30 could also comprise an imaging device for acquiring a document image or currency bill image upon which fitness determinations may be based. A camera or image based system may include, for example, convention charge-coupled devices (CCD's), cameras, video recorders, and stereo vision camera systems. A stereo vision camera system may itself include, for example, a calibrated and matched pair of high sensitivity cameras (e.g., CCD). A laser may also optionally be employed to provide a depth or range of any given point on a measured currency bill to a predetermined coordinate. In at least one embodiment, a laser could be used to map a plurality of points on a surface of a currency bill. In some embodiments, two lasers could be used to map a plurality of points on both upper and lower surfaces of a currency bill and, in combination with processor 16, to determine a thickness of the currency bill to the extent that the plurality of points on the upper and lower surfaces of the currency bill are opposite to one another across a thickness of the bill.

In accord with the present concepts, each of the aforementioned fitness defects, such as thickness, limpness, soiling, stains, etc., may further be assigned a plurality of levels in accord with the present concepts, as opposed to a typical and simplistic pass/fail assessment of a bill. Thus, the currency processing system 10 in accord with the present concepts permits a user to assign multiple levels to any desired fitness defect. By way of example, the system 10 may be adapted to permit a user concerned with the limpness and wear of processed bills to define or assign a plurality of limpness levels and a plurality of wear levels. The present concepts further include the expression of combinations and sub-combinations thereof and are adaptable to suit a user's preferences.

FIG. 2(*a*) shows one possible configuration in accord with at least some embodiments of the present concepts. In FIG. 2(*a*), a user has designated four defect types for detection (Soil, Tears, Holes, and Limpness) from a larger set of available defect types for detection. FIG. 2(*a*) also shows the each of the selected defects has been assigned a plurality of levels or grades. Turning first to the various selected Grades, the user has selected and/or defined a top-tier of "Mint" to denote bills having no detectable soil, tears, or holes, and having a limpness detector output voltage greater than or equal to 1.50 V. The output voltage of the limpness detector is an arbitrary quantity and is merely intended to represent, in this example, possible outputs of a limpness detector that may be categorized and is not intended to impart any limitations to any particular configuration of limpness detector or range of outputs thereof. One example of a limpness detector is shown in U.S. Pat. No. 4,365,508 to Loftus, issued Dec. 28, 1982, incorporated herein by reference in its entirety. Likewise, the user has designated "Grade A" to correspond to bills having soilage of less than 1 $mm^2$, tears less than 1 mm, holes less than 1 $mm^2$, and a limpness detector output greater than or equal to 1.25 V. FIG. 2(*a*) shows "Grade B" to correspond to bills having soilage of less than 3 $mm^2$, tears less than 3 mm, holes less than 10 $mm^2$, and a limpness detector output greater than or equal to 1.00 V. "Grade C" is shown to correspond to bills having soilage of less than 6 $mm^2$, tears less than 6 mm, holes less than 19 $mm^2$, and a limpness detector output greater than or equal to 0.75 V. "Grade D" denotes unfit bills and, in FIG. 2(*a*), corresponds to bills having soilage greater than or equal to 6 $mm^2$, tears greater than or equal to 6 mm, holes greater than or equal to 19 $mm^2$, and a limpness detector output less than 0.75 V.

Bill processing, in at least some aspects of the present concepts, may thus include one or more categories, subcategories, pointers, and/or relational definitions. For example, FIG. 2(*a*) also shows that the user has defined, or may define, the acceptance criteria for various defect types into a plurality of levels. In FIG. 2(*a*), the acceptance criteria relating to the "Mint" and "Grade A" categories noted above have been combined into a broader category of "Level 1". Likewise, the acceptance criteria relating to the "Grade B" and "Grade C" categories have been combined into a broader category of "Level 2" and the acceptance criteria relating to the "Grade D" category is classified as "Level 3". In short, a user may define any number of categories, subcategories, pointers, and/or relational definitions to characterize measured defect characteristics. As another example, FIG. 2(*b*) shows that several user-defined Grades have been further defined and/or related to include several Levels therewithin (e.g., Grade A includes Levels 1, 2 for Soil, Holes, and Limpness). FIG. 2(*b*) also shows that a defined Level (e.g., Level 2) may be defined to span several Grades (e.g., Grade B and Grade C for the defect of Limpness).

In at least some embodiments, the bills are assigned the grade, level and/or rating corresponding to the lowest denominator. In other words, when each of the defects are compared against the ranges noted in FIG. 2, the category ultimately assigned to a bill would be the lowest category that would simultaneously satisfy all of the criteria for the category. Thus, if a particular bill had a soilage level of less than 1 $mm^2$ (i.e., Grade A), no measurable tears (i.e., Grade A), a hole less than 1 $mm^2$ (i.e., Grade A) but possessed a limpness detector output of 1.05 V (i.e., Grade B), the bill would be assigned an overall rating of Grade B. In some alternative embodiments, the user may elect to assign the overall rating based on another paradigm, such as a weighted rating, or may elect to value or devalue various characteristics relative to one another.

It will be understood that the fitness detector 30 may include one or more detectors arranged to determine a particular fitness criteria and may include sufficient detectors to detect each and every fitness criteria currently recognized or hereinafter devised or imposed. It is also to be understood that the aforementioned sensors may be used as individual sensors or may be combined in various combinations to identify or characterize a designated fitness, defect, and/or authentication characteristic.

In addition to typical fitness features, some of which are noted above, a currency processing system 10 in accord with the present concepts may include a counterfeit detector 40 to detect the presence or absence of one or more counterfeit protective features incorporated into a bill. Examples of conventional counterfeiting features which may be advantageously sensed by the counterfeit detector 40 include magnetic features, such as ferrous oxide inks or coded or magnetic threads, infrared (IR) features (e.g., multi-frequency detection, optical pattern detection, and IR transparency), ultraviolet (UV) detection (e.g., reflected UV, through-UV, and fluorescence), and visible features (e.g., polyester fiber strip having data embedded thereon, silk embedded fibers, extremely fine-type printing). UV detection in a counterfeit detector is disclosed, for example, in U.S. Pat. No. 6,748,101 to Jones, et al., which is incorporated by reference in its entirety herein. IR detection in a counterfeit detector is disclosed, for example, in U.S. Pat. No. 6,731,785 to Mennie, et al., which is incorporated by reference in its entirety herein. Magnetic feature detection is disclosed, for example, in U.S. Pat. No. 6,810,137 to Jones, et al., which is incorporated by reference in its entirety herein.

Additional examples of conventional counterfeiting features which may be advantageously sensed by the counterfeit detector 40 include thread or foil detection, fluorescence detection, hologram/kintogram detection, window detection, and Mylar detection. Still additional examples include color shifting ink detection, raised ink detection corresponding to intaglio printing, and raised bill detection (e.g., genuine $20 corners attached to a genuine $1 bill).

Still further, the counterfeit detector 40 could be configured to permit watermark detection, such as graphic watermarks, bar code watermarks, and watermarks most likely to be detected using thru-light imaging, or to permit EURion Anti-Copy Detection or similar technology utilizing a plurality of marks (e.g., circles) arranged within bank bills in a predetermined arrangement or constellation. The counterfeit detector 40 could further include scent detection to identify characteristic signatures of chemicals emitted by various kinds of ink or identifier substances that are used in genuine currency and can be an effective way of identifying counterfeits. The counterfeit detector 40 could further include microwave feature detection, X-Ray feature detection, electro-luminescence detection, intaglio print detection, micro-perforation detection, embedded fiber detection. In view of the above, one or more counterfeit detectors 40 could be provided in combination with one or more fitness detectors 30.

Still further, a tracking system 50 could be implemented in combination with one or more counterfeit detectors 40 and/or fitness detectors 30. Tracking of bills or other documents by the tracking system 50 could be accomplished by recording part of, or the entirety of, the serial number, bar code, or other identifying information that would uniquely denote a particular bill. According to some embodiments, this tracking information could be used to implement a nation-wide data base of serial numbers or identifiers that can be used to periodically track bills as they move around the country (i.e., as they are processed by different devices according to an embodiment of the present invention which are connected to a network or database bearing the tracking information). When implemented in combination with the fitness detector 30, the tracking system 50 can permit not only the bill to be tracked and recorded, but also the condition of the bill.

Radio frequency imbedded devices (RFIDs) present another opportunity for tracking and tracking system 50 could be adapted to include a system for tracking currency based on individual tracking tags or devices.

U.S. Pat. No. 6,311,819 B1, incorporated herein by reference in its entirety, describes a multiple pocket (multi-pocket) currency processing device including, for example, 3, 4 and 6 pockets, which can be employed in various embodiments of the presently disclosed currency processing system 10. Multi-pocket currency processing devices or multi-pocket sorters (hereinafter collectively referred to as "MPS") in accord with the present concepts may comprise a greater number or lesser number of pockets and the number of pockets is not limited.

Figure 3:
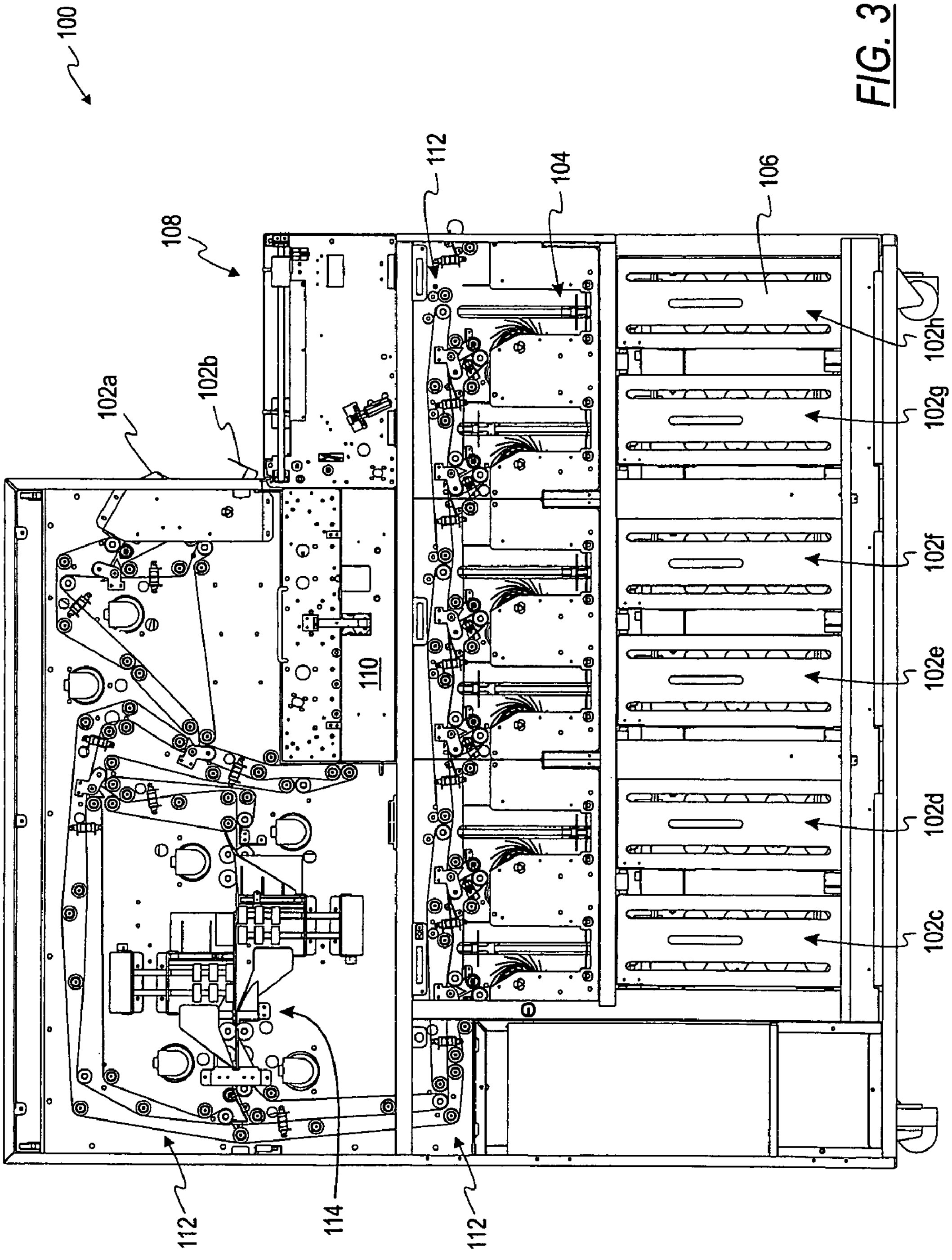
FIG. 3 is a front view of a currency processing device having multiple output receptacles for use in accord with one aspect of the present concepts.
Figure 4:
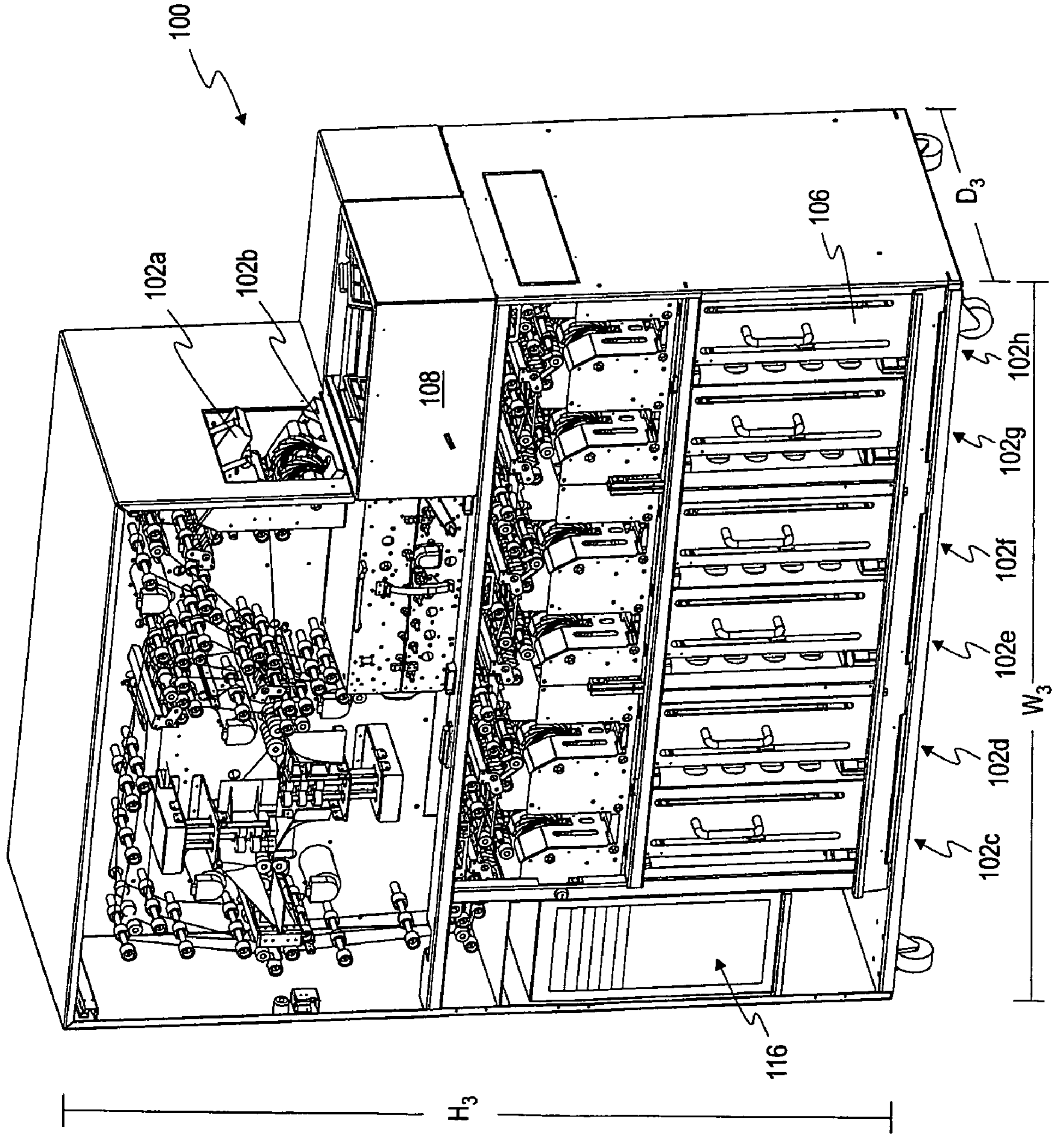
FIG. 4 is a perspective view of the device of FIG. 3.

Referring now to FIGS. 3 and 4, there is shown a currency processing device 100 having a plurality of output pockets 102*a-h* (hereinafter "MPS" for multi-pocket sorter) used in an embodiment of currency processing system 10. The MPS 100 illustrated in FIGS. 3-4 includes eight output pockets 102*a-h*: two upper output pockets 102*a,b* and six lower output pockets 102*c-h*. Further, modular lower output pockets (not shown) may be added to the MPS 100 to increase the number of lower output pockets, such as to add pockets 102*i-k* (not shown). Each of the lower output pockets 102*c-h* includes an escrow region 104 (shown with respect to lower output pocket 102*h*) for receiving and stacking currency bills and a storage cassette 106 for holding stacks of processed currency bills. In FIG. 4, a desktop computer 116 is shown disposed within an opening in the currency processing machine. Currency bills are transported to a particular one of the escrow regions 104 and are stacked therein.

At specified times or on the occurrence of specific events, currency bills stacked in an escrow region 104 may be moved into the corresponding storage cassette 106. According to one embodiment, each storage cassette 106 is capable of holding up to approximately one thousand currency bills.

The MPS 100 is capable of sorting currency bills according to denomination into each of the output pockets. Using United States currency bills as an example, a stack of mixed bills is received in an input receptacle 108. Bills are transported, one at a time, from the input receptacle 108 through an evaluation region 110 by a transport mechanism 112 to the plurality of output pockets 102*a-h*. In sorting the currency bills, the evaluation region 110 identifies the denomination of each of the currency bills and the transport mechanism delivers each currency bill to a particular one of the lower output pockets 102*c-h*. In some embodiments, the device 100 sorts bills according to denomination (e.g., U.S. $1 bills into lower output pocket 102*c*, U.S. $5 bills into lower output pocket 102*d*, etc.), while currency bills triggering error signals, such as no call or suspect document error signals, are off-sorted to upper output pockets 102*a-b*.

Numerous other operational alternatives are available to an operator of the MPS, including fit/unfit sorting. For example, the first upper output pocket 102*a* can be used to receive currency bills triggering no call error signals and the second upper output pocket 102*b* can be used to receive currency bills triggering suspect document error signals. Many other alternative operation modes and examples thereof are disclosed in U.S. Pat. No. 6,398,000 to Jenrick et al. and U.S. Pat. No. 6,460,705 to Hallowell, each of which is incorporated herein by reference in its entirety.

In some embodiments, the MPS includes a currency bill facing mechanism 114, interposed in the transport mechanism 112, intermediate the currency bill evaluation region 110 and the lower output pockets 102*c-h* that is capable of rotating a bill approximately 180° so that the face orientation of the currency bill is reversed. The leading edge of the bill (the wide dimension of the bill according to one embodiment) remains constant while the bill is rotated approximately 180° about an axis parallel to the narrow dimension of the bill) so that the face orientation of the bill is reversed. Further details of the operational and mechanical aspects a bill facing mechanism for use in the MPS 100 are disclosed in U.S. Pat. No. 6,074,334 to Mennie et al. and U.S. Pat. No. 6,371,303 to Klein et al., each of which is incorporated herein by reference in its entirety.

Various fitness detectors 30, counterfeit detectors 40, and tracking systems 50 can be employed in the currency handling methods and devices disclosed herein including without limitation that currency handling system represented in FIGS. 3-4 and variations thereof, as well as other compatible devices that will be apparent to those of skill in the art.

In accord with the present concepts, following identification of fit and unfit genuine notes, the fit and unfit genuine bills can be sorted in various modes based on a users' needs and requirements. These modes could be user-definable and saved to a currency processing system 10 memory 18 or remote memory device (e.g., through I/O 17) so the various user modes could be called up at any time by a user. In various exemplary modes, the bills could be sorted by fitness levels and/or fitness defect, and output to pockets 60, as generally shown in the examples of FIGS. 5(*a*)-(*c*).

Fitness levels and/or fitness defects can be established for each of the aforementioned fitness criteria, or other designated fitness criteria selected by the user of the currency processing system 10 (e.g., MPS 100), by the user and/or by the manufacturer or distributor of the currency handling device 10. According to at least some embodiments, fitness level definitions can be changed by updating related definitions and/or parameters stored in memory 18 or other local or remote memory device. In still other embodiments, bills could be selectively sorted, for example, based on the fitness level and/or fitness defect.

Figure 5A:
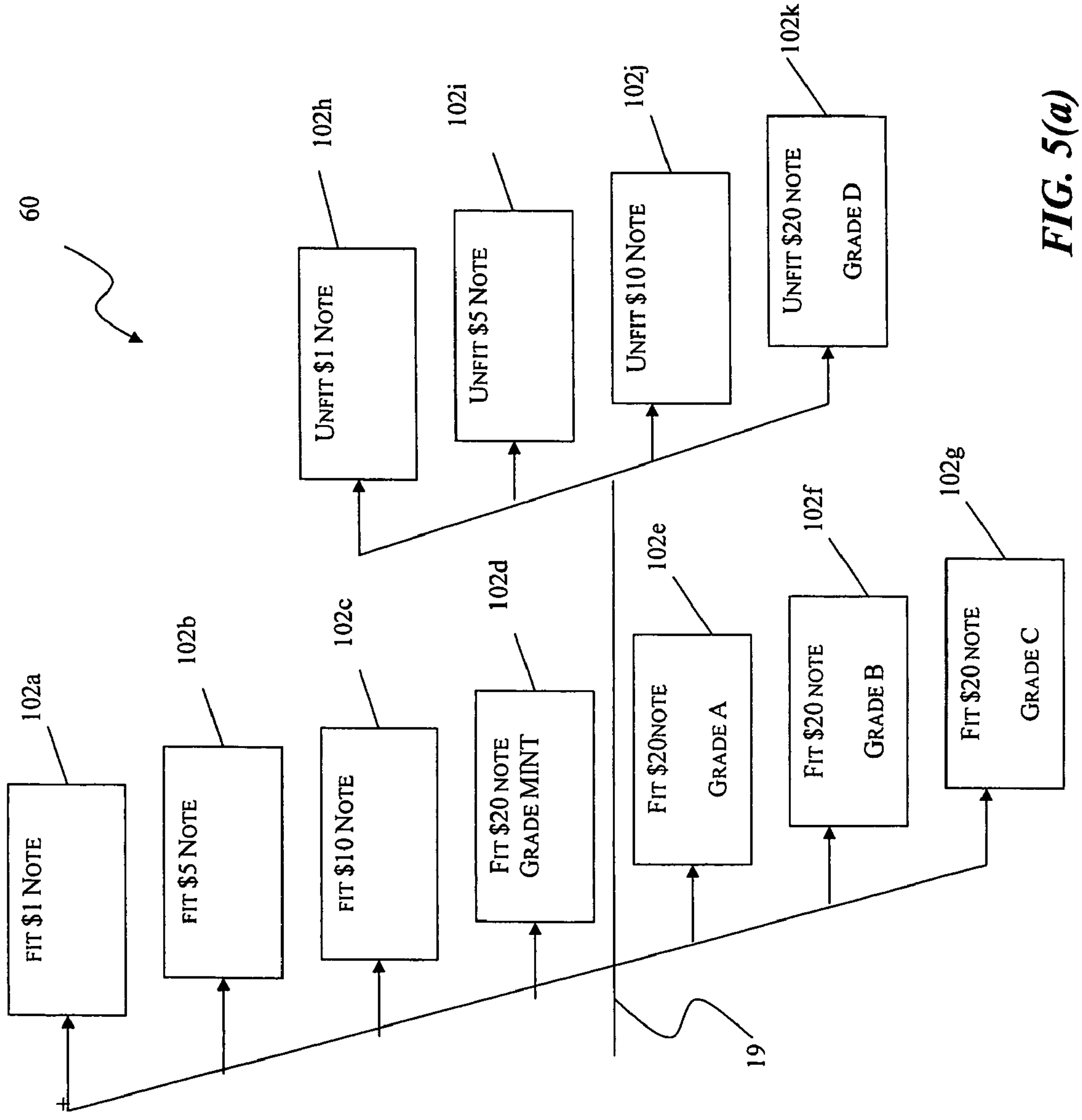
FIGS. 5(*a*)-(*i*) show various embodiments of aspects of the present concepts.

In FIG. 5(*a*), an embodiment is shown wherein a range of notes of mixed denomination ($1, $5, $10, $20) may be sorted and categorized as "fit" or "unfit". In this example, fit $1 notes are sorted into pocket 102*a*, fit $5 notes are sorted into pocket 102*b*, and fit $10 notes are sorted into pocket 102*c*. As to the $20 notes, the machine in this example has been configured, such as by either a user setting or by a manufacturer setting, to sort the $20 notes into one of a plurality of additional grades of fitness. According to this example, a first quality of $20 notes (e.g., Mint) can be sorted into pocket 102*d*, a second quality of $20 notes (e.g., Grade A) can be sorted into pocket 102*e*, a third quality of $20 notes (e.g., Grade B) can be sorted into pocket 102*f*, and a fourth quality of $20 notes (e.g., Grade C) can be sorted into pocket 102*g*. The unfit $1 notes are output to pocket 102*h* and the unfit $5, $10, and $20 notes are output to pockets 102*i*, 102*j*, and 102*k* (not shown in FIGS. 3-4).

As discussed above with respect to the example of FIG. 2, the user may select from one of numerous sorting and/or packaging options. FIGS. 5(*b*)-5(*i*) illustrate examples of types of selection screens that may be presented to a user of the machine. In FIG. 5(*b*), a screen prompts the user (e.g., end user, technician) to select the denominations of bills to be sorted for fitness. For each of these denominations, FIG. 5(*c*) prompts the user to enter the levels of fitness into which the denomination is to be sorted. As illustrated, each denomination may be sorted into Mint, Grade A, Grade B, Grade C, Unfit, or Fit. Additional categories may also be entered by a user. In FIG. 5(*d*), the user is requested to input, for each denomination and level of fitness, a desired combination of fitness types (e.g., soil, tears, holes, limpness, note length, note width, missing corner, folded corner, thickness, ink wear, etc.) that are to apply thereto. Thus, a given denomination (e.g., $20) and level of fitness (e.g., Grade A) may selectively be sorted to a first set of fitness types (e.g., soil, tears, holes, limpness), whereas another level of fitness (e.g., Mint) for the same denomination selectively be sorted to a different set of fitness types (e.g., soil, tears, holes, limpness, note length, note width, missing corner, folded corner, thickness, ink wear).

Likewise, one denomination (e.g., $20) may be tested relative to a different set of fitness types than another denomination (e.g., $10) even within a similar assigned grade (e.g., Grade A). For example, a $20 Grade A note may be required to meet the minimum acceptance criteria for eight selected fitness types, whereas a $10 Grade A note may only be required to meet the minimum acceptance criteria for six selected fitness types.

FIG. 5(*d*) shows that, for each of the selected fitness types and levels of fitness, the user may enter the fitness criteria for each of the fitness types. As shown, numbered options 1-5 relate to various levels of fitness for Soil. Successive options would permit similar user-definition of these fitness criteria, or other fitness criteria, for each of the fitness types selectable by the user. FIG. 5(*e*) presents an optional summary screen. In one alternative to the information displayed in FIG. 5(*e*), a small pop-up window, banner, or the like could be persistently, yet unobtrusively, displayed on each of the user data entry screens to display a tally, possibly abbreviated or coded, of the selected options. FIG. 5(*g*) shows an example of a screen wherein a user is being prompted to enter the fitness criteria to be applied to a $20, Grade A note previously entered in a user-defined sort (e.g., see FIGS. 5(*b*)-(*e*)). In FIG. 5(*g*), options 1-4 display pre-defined fitness criteria for a Grade A note, which may optionally be denomination specific. The user may opt to enter different values by selecting options 5-8 and entering user-defined values. Additional options (not shown) may be presented to the user enabling the user to, for example, return to a prior screen to edit, add, or remove fitness types, or to select from other options and combinations of settings.

FIG. 5(*h*) shows that, for each of the sorted denominations, the user may define the criteria that is to be used to assign an overall fitness grade. In other words, a user may dictate how a note is to be adjudged to be fit or unfit if, for example, five fitness types of a $10 note were determined to satisfy Grade A acceptance criteria and one fitness type was determined to satisfy only a Grade B acceptance criteria. In a least common denominator setting, for example, the $10 note in the example would be assigned the lowest rating, Grade B, of all of the measured categories. Likewise, if a particular denomination were only to be sorted into fit or unfit, as compared to 8 fitness types, a least common denominator setting would reject the note as unfit if any of the fitness criteria were determined to fall below the "fit" acceptance criteria. In a weighted average analysis, however, the $10 note in the example would be classified as a Grade A note. Users may alternatively be permitted to define other criteria by which the overall ratings are assigned.

FIG. 5(*i*) shows that, the user is provided an option to specifically designate the output pocket or receptacle into which each denomination, fitness level, and fitness type is to be discharged. In this example, the user is being prompted to designated an output pocket for a $20 Grade A note. In one aspect, the prompt may also indicate, in this example screen or in another screen, different packaging options available to the user. For example, output pockets 102*a*-102*h* may be provided with one type of note packaging, whereas output pockets 102*i*-*k* may be provided with one type of note packaging.

The above exemplary screens are not intended to limit the present concepts in any way and are intended, instead, to merely present at least some aspects of at least some embodiments of the present concepts and to generally illustrate user-definability of sorting and/or fitness determination in accord with aspects of the present concepts.

In accord with the above, the sorting and fitness evaluation and acceptance criteria are definable by the user to particularly meet the user's needs. For example, a Mint and/or Grade A designation could be associated with new or ATM quality bank bills, the specific criterion selectable by the user, with the Grade B bills comprising a lesser quality of fit bills. Further, a user may opt to subdivide unfit notes of one or more denominations into a plurality of pockets or receptacles corresponding to a designated defect type. For example, unfit $20 bills may be output to a plurality of pockets in accord with pre-defined user criteria, as opposed to discharging every unfit $20 bill into a single pocket. Pocket 102*c* may be designated to receive unfit $20 bills having a fitness type or defect (e.g., Soil) of a first level defined by a user (e.g., Level 1) and pocket 102*d* may be designated to receive unfit $20 bills having the same fitness type or defect of a different degree (e.g., Level 2). The terms Level 1 and Level 2 are merely arbitrary designators intended to illustrate that unfit bills of a given denomination, or even multiple denominations, may be selectively sorted and discharged in accord with a selected fitness type and/or level.

From the variously configured pockets 102a-102k, the sorted bills may then be packaged in-place (e.g., cassettes) or moved to a packaging station for strapping. One example of a suitable strapping apparatus is disclosed in U.S. Pat. Appl. Pub. No. 2004-003980 to Hallowell et al., published on Jan. 8, 2004, which is hereby incorporated by reference in its entirety.

Further to the above-noted user-friendly concepts, providing bill packaging in accord with the present concepts may also be user-definable. Once the bills could be sorted by fitness levels and defect codes, it should be noted that they could be put into either pockets, cassettes, strapped, or strapped and placed in cassettes. Unfit bills, in particular, could be strapped by denomination in quantities of 100, 200, 250, 300, 500, 1,000, 1,500 and 2,000 bills, or could be strapped with mixed denominations in similar quantities. The straps would advantageously be color-coded with the standard ABA color code appropriate to the denomination and be plainly marked with the financial institutions name and ABA routing number and the identification number of the depositing office, as well as the dollar amount of the currency contained by the strap, the identity of the persons who verified the strap, and the date of verification. Other means of conveying such information may alternatively be implemented in accord with the present concepts to indelibly assign information to the finished strap, brick, or bundle such as, for example, a customized shrink-wrap or security label.

Whereas conventional bills are sorted by denomination and passed to the Federal Reserve for processing, sending 10 units of 100 strap-banded bills wrapped together in a bundle, the present currency processing machine 10 is adapted to sort out fit from unfit bills and separately bundle or package such unfit bills into separate packages for shipping to one of the twelve Federal Reserve Banks ("the Fed") or to other financial institutions or receivers. In accord with the present concepts, the unfit bills, or graded fit bills, may be packaged in non-standard sizes for inter-branch or intra-branch shipment to other financial institutions or receivers, such as other local banks, for fees and/or faster response times which might be lower and/or faster, respectively, than a similar request placed with the Federal Reserve. Thus, a separate market can be created in currency packaging and shipment wherein a bank needing ATM quality notes may request them from another bank in exchange for fit currency of a lesser grade for a fee that would be lower than that charged by the Federal Reserve (if the bank had exceeded its allotment of deposits or orders for the week) and may receive same-day service.

Bills deemed unfit may advantageously be permanently marked by the system 10 such as by the MPS 100 prior to the packaging function in a manner that would render the bills clearly unfit so as to prevent later misuse or misappropriation of the unfit bills. Such permanent marking could include, but is not limited to, printing across one or both sides of the bill (e.g., "VOID") using one or more permanent and/or safety inks or chemicals, perforation of the bill at rates of about 1000 bills per minute, and/or discoloration of selected portions of the bill. Encryption and non-visible security features may further be added to bills deemed unfit during processing to discourage subsequent theft of the packaged unfit bills.

If the manner in which the unfit bills are rendered unsuitable is sufficiently rigorous, then the demands required of the packaging can be correspondingly reduced, if not eliminated. For example, unfit bills having "VOID" written in indelible ink across the face of the bill and "VOID" written out therein in perforations, could likely be packaged into cardboard boxes for sealing and shipping to the Federal Reserve for replacement with fit currency. In other words, the security precautions against theft and tampering could be reduced, with a corresponding benefit through the lessening of armored car service costs.

Alternatively, unfit bills could be put into tamper-proof cassettes that could be sent back to the Federal Reserve or could be put into bags and shrink-wrapped and sent back to the Federal Reserve. Unfit bills could alternatively be put into plastic currency bags and shipped to the Federal Reserve. The conventional plastic currency bags are required by the to be clear, plastic bags designed for one-time use, which have tamper-evident bag seals, interior measurements not exceeding 19"×28", thickness of at least 5-mil for 19"×28" bags and lesser thicknesses for smaller bags provided the bag remains durable and tear resistant. Clear plastic containers, metal containers, and heavy cloth bags may also be used to ship currency to the Federal Reserve using registered mail.

It is to be noted that the present currency processing system permits multiple modes of packaging unfit bills for shipment, such as to an authorized bank, disposal site and/or repository site, the particular mode of packaging being user-definable and customizable by the user to meet their unique requirements and needs. In other words, the user may discharge selected denominations and/or fitness types and/or fitness levels to selected output pockets or receptacles or to selected conveyance devices, wherein such pockets, receptacles, and conveyance devices are, in turn, associated with specified packaging systems. In one example, for example, the user could specify one type of packaging for lower value bills ($1) and another type of packaging for higher value bills ($100). In a preferred aspect, the packaging function may be modular and may permit a user to select from one or more available packaging options.

According to some embodiments, the processes and apparatuses for packaging of bills deemed unfit for continued circulation could comprise packaging devices such as the strapping devices disclosed in U.S. Pat. No. 4,025,420 to Horino, U.S. Pat. No. 4,117,650 to Ito et al., U.S. Pat. No. 4,845,917 to Omura et al., U.S. Pat. No. 6,460,705 to Hallowell, U.S. Pat. No. 6,574,941 to Neri, and U.S. Pat. No. 6,598,726 to Lundblad et al., each of which is incorporated herein in its entirety. These systems and devices could be integrated with or connected to the disclosed currency processing system 10 or other currency processing system configured in accord with the present concepts.

According to some embodiments, the pockets 60 into which the unfit bills are deposited could comprise a plastic film open container dimensioned to be slightly larger than that of the desired quantity of bills (e.g., for 500 bills of U.S. currency, slightly greater than 2.61"×6.14"×2.15"), particularly in the height-wise direction. Alternatively, the stacked unfit bills could be removed from the corresponding one of the pockets 60 and placed in such plastic film open container. Following placement of the unfit bills, the plastic film is heated to shrink wrap the unfit bills in a tight bundle. Multiple sequences of shrink wrapping may be employed to encase the bills in multiple layers of plastic film, each of which may optionally be selected to possess different properties or characteristics. According to some embodiments, the plastic film may be colored along approximately a center-line thereof with a standard ABA color code appropriate to the denomination to be packaged (e.g., a plastic film for $20 bills could comprise a violet line which would visually mimic a violet strap).

The currency processing system 10 in accord with the present concepts may further comprise a currency tracking system 50, represented in FIG. 1. In combination with various fitness and counterfeit criteria, the bills being processed in the first, second, and third stations 25, 30, 40, or sub-combination thereof, could be tracked by storing an association between the serial number of each bill, or representation thereof, on a local memory 18 or on a remote memory, accessible through I/O port 17. A representation of the serial number could include, for example, an encryption of the serial number, an image of the serial number, an encryption of an image of the serial number, or an encrypted/non-encrypted composite of the serial number and other identifying information, such as the series or Federal Reserve Bank letter and number. In accord with some embodiments of the currency tracking system, at least one measure of the fitness and/or other identifying information, such as the bill denomination would be associated with the serial number or other representation thereof incorporating the serial number, in whole or in part.

The stored information on each bill can be tracked locally (i.e., within a bank) or remotely (e.g., outside of the bank) to permit tracking of fitness characteristics, counterfeit characteristics, and/or the particular readings for unfit bills for a given sensor or detection device (e.g., average readings, maximum readings, minimum readings). This information can be used locally or remotely, through a network or through a communication device or system, to permit overall performance tracking of both the processing, in general, and individual bills, by the bank, the Federal Reserve, Secret Service, or other oversight entity. For example, the stored information could include statistics regarding the number of bills run and the number of bills off-sorted as being unfit, as well as the conditions under which it was determined that the bill was unfit. The stored information can also be made available to outside entities (i.e., the Federal Reserve) to permit tracking and/or updating of information on particular bills to track the circulation and/or condition of any particular bill through its life. Serial number tracking would be particularly beneficial in identifying the introduction of counterfeit bills bearing a common serial number or a characteristic defect indicative of common origin.

The fitness detection sensor(s) and methods disclosed can also be used to assess the fitness of documents other than currency bills. Accordingly, when describing various embodiments of the present invention, the term "bills" or "currency bills" refers to official, currency bills including both U.S. currency bills, such as a $1, $2, $5, $10, $20, $50, or $100 bill, and foreign currency bills. Foreign currency bills are bank bills issued by a non-U.S. governmental agency as legal tender, such as the Euro, Yen, or Pound. Although the invention embodiments refer to the "denomination" of currency bills as a criterion used in evaluating the currency bills, other predetermined criteria can be used to evaluate the currency bills, such as, for example, color, size, and orientation. Other forms of bills or documents could also be processed in accord with aspects of the present invention including non-currency documents and substitute currency notes.

Thus, a method for tracking currency in accord with the present concepts could include the acts of processing a plurality of bills to determine fitness and, optionally, for tracking such bills. The method involves, generally, processing a plurality of bills and retrieving from each of the processed bills characteristic information, inclusive of fitness information, unique to each bill. The characteristic information includes at least one characteristic relating to a bill fitness (e.g., ink wear, soil, substrate defect, etc.) and another identifying characteristic relating to a bill (e.g., serial number, bar code, RFID signature, etc.). This characteristic information may then be used not only to track currency, but to track the fitness of the currency over time. Once the currency processing system 10 processes a bill, the characteristic information may be stored in a data storage medium (e.g., a local or remote database or on a storage device or server). From this storage medium, attached currency processing systems 10 or other computers or terminals may be provided access to the stored information on currency and fitness. If the bill has been previously processed and its information stored in the database, the previous information may be retrieved, compared, and the record optionally updated or appended to reflect any new characteristic information, such as a changed fitness. If the bill has not been previously processed, the characteristic information may be stored as a new record in the database. Preferably, the characteristic information relating to fitness is logically associated with the characteristic information relating to the currency identification (e.g., serial number). In this manner, changes to the fitness of a particular bill over time may be ascertained.

In still additional embodiments, a neural network note recognition system could be integrated with the above concepts, neural network note recognition system comprising a plurality of different detector types logically integrated into a neural network to adaptively determine authenticity and/or fitness.

Subsequent to the aforementioned fitness determinations and processing of the notes, also provided may be a separate process and apparatus for verifiably destroying unfit notes. Once notes have been deemed unfit for continued circulation, the notes may be indirectly destroyed by packaging the unfit notes, such as noted above, for shipment to a facility designated for destruction of the unfit notes. Alternatively, in accord with at least some of the present concepts, the unfit notes may be destroyed directly. Devices for direct or in-situ destruction of the unfit notes could include, for example, mechanical devices assuring complete destruction (e.g., shredding and/or disintegrating unfit notes using a mechanical shredder, press, etc.) or mechanical devices for causing a less than complete obliteration of the unfit notes (e.g., using a marking, perforation, or printing device which would leave the note substantially intact, but clearly not redeemable or capable of recirculation). In other aspects, devices for direct or in-situ destruction of the unfit notes could include state-changing devices for producing an irreversible change of state to the unfit notes by chemical and/or incendiary processes (e.g., laser incineration). The means for destruction could be integrated with the verification device, or separate from the verification device. These means for destruction, or the like, are combined with means for indisputably verifying that the unfit notes designated for destruction were, in fact, destroyed. The verification device could include, for example, imaging the note or a definitive portion thereof (e.g., a bottom quarter of the note including the serial number and denomination) as it irretrievably enters the destruction device. The verification device could also include a multi-image capture device comprising imaging the unfit notes at two or more different stages or states of processing and/or destruction. Alternatively, video cameras or CCDs could be employed. In another aspect, coupons could be removed from each unfit note (e.g., a portion of the note including unique indicia for identifying the destroyed note, such as one serial number) for retention and verification purposes, while the remainder of the unfit note is destroyed, with or without imaging. The images may advantageously be encrypted prior to electronic transmission and/or storage.

Similarly, a local independently verifiable document destruction method and device would permit accelerated credit of money to local banks and lending institutions for unfit currency. In one aspect, a method for accelerated credit of money to banks for unfit currency would, in accord with the concepts outlined above, comprise a device for processing and sorting notes determined to be unfit as outlined above or and/or a device for verifying that received carrier (e.g., bundles, packages, bags, cassettes, or the like) of notes designated as being unfit by another source are, in fact, both unfit and possess the value indicated by the marking or documentation accompanying the carrier. If the notes designated by another source as being unfit are processed in a predetermined or unified manner, the verification equipment can be reduced to eliminate the separate fitness determination and to focus exclusively on processing and scanning the notes to verify that the inspected notes correspond to those notes detailed in an associated electronic file (e.g., an encrypted data file). For example, in accord with the above, unfit notes could be imprinted with a colored dye across all but the serial number and the corners or other distinctive characteristic sufficient to identify the note and denomination. The verification device could then comprise a CCD or other imaging device to image each note and convert the imaged data to a usable form that could be compared, note for note, to an associated electronic file. If the imaged note matches (e.g., same serial number, same denomination, and evidence of imprinted ink in one or more other inspection points), then a counter could be appropriately incremented or decremented.

In various aspects, a local independently verifiable document destruction device would comprise a local device for destroying unfit notes, a sensing device for storing information characteristic of each individual unfit note destroyed, a storage device wherein the information characteristic of each individual unfit note destroyed is retained for validation and/or review, and a verifiable access portal to the information to facilitate independent certification of the destruction of the unfit notes. An local independently verifiable document destruction method and device in accord with the above concepts permits, upon independent verification of the destruction of the unfit notes, crediting of an amount of destroyed unfit notes by electronic or physical funds transfer through a data input/output (I/O) device, communications port, communication path, printer (e.g., security paper), and/or writing device (e.g., CD-RW, magnetic storage device, etc.).

In accord with any of the aspects, concepts, and embodiments disclosed herein, a sensing device may optionally be provided to read or capture a bar code or other code imprinted or on embedded within the currency bill.

In accord with any of the aspects, concepts, and embodiments disclosed herein, any currency bill deemed unfit is optionally marked as being unfit or rendered clearly unusable following a determination that the currency bill is unfit. Thus, the currency processing system 10 may comprise an unfit bill processing device including, for example, (1) a mechanical device assuring complete destruction (e.g., shredding and/or disintegrating unfit notes using a mechanical shredder, press); (2) a mechanical device configured to cause a less than complete obliteration of the unfit notes (e.g., using a marking or printing device, such as a laser, stamp, or ink jet, or a perforation device which would leave the note substantially intact, but clearly not redeemable or capable of recirculation); and/or (3) state-changing devices for producing an irreversible change of state to the unfit notes by chemical and/or incendiary processes (e.g., laser incineration).

The above-noted unfit bill processing device may advantageously, but optionally, be integrated with or used in combination with a verification device for indisputably verifying that the unfit notes were clearly rendered unusable. Such verification device may include, for example, (1) an imaging device to image the currency bill as it enters the unfit bill processing device; (2) an imaging device to image the serial number and/or denomination of the note as it enters the unfit bill processing device; (3) an imaging device configured to obtain a multi-image capture comprising images of the unfit currency bill at two or more different stages or states of processing in the unfit bill processing device; and/or (4) removing from each unfit currency bill the serial numbers (coupons), or other unique indicia of identification, for retention and verification purposes, with a corresponding destruction of the remainder of the unfit currency bills (with or without imaging). The images may advantageously be encrypted.

As the term is used herein, the term currency bills shall comprise conventional U.S. currency bills or foreign currency bills. The present concepts are applicable generally to any negotiable instruments (e.g., checks) and such applications are within the scope of the present concepts.

Unless the context clearly requires otherwise, the phrase "at least one of 'A' and 'B'," where "A" and "B" may represent anything (e.g., an act, a structure, a component, etc.), shall mean any combination of "A" and/or "B" (i.e., only "A," only "B," or "A and B"). Likewise, the phrase "at least one of 'A,' 'B,' and 'C.'" shall mean any combination of "A" and/or "B" and/or "C" (e.g., only "A," only "B," only "C," "A and C," "B and C," "A and B and C," etc.).

While the present concepts are susceptible to various modifications and alternative forms, specific embodiments thereof have been shown by way of example in the drawings and herein described in detail. It should be understood, however, that the present concepts are not intended to limit the invention as to the particular forms disclosed, but on the contrary, the intention is to cover all modifications, equivalents, and alternatives falling within the spirit and scope of the invention as defined by the appended claims. For example, in combination with any of the above noted concepts, inclusion of biometric devices, (e.g., retinal scan, voice imprinting, facial or facial feature recognition, fingerprint, etc.) may provide enhanced control, access, authorization, and verification of any action or transaction. As an additional example, methods described herein may comprise a lesser or greater number of acts and/or acts executed in various orders other than those particularly disclosed.

What is claimed is:

1. A user-configurable currency processing device, comprising:

an input receptacle adapted to receive input currency bills;

a first fitness detector adapted to retrieve at least a first characteristic information relating to a first predefined fitness type from each of the currency bills;

a second fitness detector adapted to retrieve at least a second characteristic information relating to a second predefined fitness type from each of the currency bills;

a transport mechanism adapted to serially transport each of the currency bills from the input receptacle to the first fitness detector and the second fitness detector and then to one of a plurality of output receptacles;

a physical memory device bearing assignments of designated values of said first characteristic information to predetermined ones of said plurality of first predefined fitness levels and assignments of designated values of said second characteristic information to predetermined ones of said plurality of second predefined fitness levels;

a controller configured to process the first characteristic information retrieved for each of the currency bills by the first fitness detector and assign to the currency bill a first fitness level associated with the first characteristic information of the first fitness type and corresponding to a designated value of the processed first characteristic information and configured to process the second characteristic information retrieved for each of the currency bills by the second fitness detector and assign to the currency bill a second fitness level associated with the second characteristic information of the second fitness type and corresponding to a designated value of the processed second characteristic information, and wherein the plurality of defined fitness levels for the first characteristic information of the first predefined fitness type comprises at least an unfit level and a plurality of fit levels, and wherein the plurality of defined fitness levels for the second characteristic information of the second predefined fitness type comprises at least an unfit level and a plurality of fit levels.

2. A user-configurable currency processing device, according to claim 1, wherein said controller is configured to determine a net fitness level from the first fitness level and the second fitness level.

3. A user-configurable currency processing device, according to claim 2, wherein said controller is further configured to discharge each currency bill from the transport mechanism to an output receptacle designated by a user to receive said net fitness level of currency bills.

4. A user-configurable currency processing device, according to claim 3, further comprising a denomination detector for retrieving third characteristic information associated with a denomination of a currency bill.

5. A user-configurable currency processing device, according to claim 4, wherein said physical memory device bears user-defined assignments of designated levels of said first characteristic information and said second characteristic information for each of the plurality of defined fitness levels.

6. A user-configurable currency processing device, according to claim 5, further comprising an authenticity detector for retrieving fourth characteristic information associated with an authenticity of the currency bill.

7. A user-configurable currency processing device, according to claim 5, wherein said first fitness detector comprises at least one of a limpness detector, a thickness detector, a soil detector, a tape detector, a hole detector, a tear detector, a staple detector, a graffiti detector, stain detector, or an ink wear detector.

8. A user-configurable currency processing device, according to claim 7, wherein said second fitness detector comprises any least one of a limpness detector, a thickness detector, a soil detector, a tape detector, a hole detector, a tear detector, a staple detector, a graffiti detector, stain detector, and an ink wear detector.

9. A user-configurable currency processing device, according to claim 8, further comprising at least one sensor configured to read or capture a bar code from a currency bill.

10. A user-configurable currency processing device, according to claim 1, further comprising an unfit bill processing device configured to render unusable currency bills determined to be unfit.

11. A method of processing currency in a currency processing machine, comprising the acts of:

retrieving, using a fitness sensor, from a plurality of input currency bills, characteristic information from each of the bills, the characteristic information comprising at least a first characteristic information relating to fitness;

using a processor, process the first characteristic information and assign to each currency bill, based on the first characteristic information, a fitness type and a respective fitness level selected from a plurality of fitness levels for the fitness type, the plurality of fitness levels comprising an unfit fitness level and further comprising a plurality of different fit fitness levels for the fitness type, the fitness type and the fitness levels being defined by a user; and outputting each currency bill along one of a plurality of output paths of the currency processing machine designated by the user to receive currency bills having at least one of the fitness type and the fitness level assigned to the currency bill.

12. A method of processing currency in a currency processing machine, according to claim 11, further comprising the act of:

retrieving, from a plurality of input currency bills, characteristic information from each of the bills, the characteristic information comprising at least a second characteristic information relating to an identification number of the currency bill.

13. A method of processing currency in a currency processing machine, according to claim 12, further comprising the act of:

retrieving, from a plurality of input currency bills, characteristic information from each of the bills, the characteristic information comprising at least a third characteristic information relating to a denomination of the currency bill.

14. A method of processing currency in a currency processing machine, according to claim 11, wherein the first characteristic information comprises information relating to a bill substrate defect comprising at least one of a dimensional defect, hole, tear, corner, or tape.

15. A method of processing currency in a currency processing machine, according to claim 11, wherein the first characteristic information further comprises information relating to at least one of ink wear, soilage, and series.

16. A method of processing currency in a currency processing machine, according to claim 15, further comprising the act of:

outputting to a data storage device, for each currency bill, characteristic information pertaining to at least one of a fitness type, a fitness level, an identification number, and a denomination.

17. A method of processing currency in a currency processing machine, according to claim 12, further comprising the act of:

rendering unfit currency bills unusable.

18. A method of processing currency in a currency processing machine, according to claim 17, wherein said act of rendering unfit currency bills unusable comprising at least one of printing a mark on said unfit currency bills, removing at least a predetermined portion of said unfit currency bills, changing a state of at least a predetermined portion of said unfit currency bills, and destroying at least a predetermined portion of said unfit currency bills.

19. A method for tracking currency comprising the acts of:

processing a plurality of bills, using a currency processing machine, to determine fitness;

using a sensor, reading from each of the plurality of processed bills characteristic information comprising at least a first characteristic information relating to a bill fitness and a second characteristic relating to a bill serial number;

using a processor, assigning the first characteristic information to one of a plurality of distinct fit fitness levels defined by a user, each of the distinct fit fitness levels corresponding to predefined and distinct levels of the first characteristic information;

storing the second characteristic information to a physical memory;

storing the first characteristic information, the assigned fitness level, or both to a physical memory; and using the processor, comparing at least the second characteristic information to a corresponding field in a database of previously processed bills, wherein the plurality of distinct fit levels comprises a plurality of fit levels for a particular fitness characteristic and an unfit level.

20. A method for tracking currency according to claim 19, further comprising the acts of:

associating the first characteristic information with the second characteristic information;

storing the association of the first characteristic information with the second characteristic information in a physical memory in the database of previously processed bills.

21. A method for tracking currency according to claim 20, further comprising the act of:

determining a difference between the first characteristic of a processed bill and a first characteristic for the processed bill stored in the database of previously processed bills.

22. A method for tracking currency according to claim 21, wherein the first characteristic information comprises information relating to at least one of ink wear, soilage, and series.

23. A method for tracking currency according to claim 21, wherein the first characteristic information comprises information relating to a bill substrate defect comprising at least one of a dimensional defect, hole, tear, corner, or tape.

24. A method for tracking currency according to claim 19, further comprising the act of:

storing data relating to at least one of a processing bank, processing time, processing machine, and user in the database of processed bills in association with the second characteristic information.

25. A currency processing device, comprising:

an input receptacle adapted to receive input currency bills;

a fitness reading device adapted to retrieve at least a first characteristic information relating to fitness from each of the currency bills;

a denomination reading device adapted to retrieve at least a second characteristic information relating to denomination from each of the currency bills;

a transport mechanism adapted to serially transport the currency bills from the input receptacle to the reading device and then to one of a plurality of output receptacles;

a memory device for storing one of or both of user-definitions and user settings for at least the first characteristic information;

an I/O device configured at least to receive a user input;

a processor adapted to process the first characteristic information retrieved for each of the currency bills by the fitness reading device and assign to the currency bill to a fitness level selected from a plurality of pre-defined fitness levels, the selected fitness level corresponding to the processed first characteristic information; and a controller adapted to discharge each currency bill having a first denomination and a first fitness level, corresponding to a fit condition in a first fitness type, to a first output destination, discharge each currency bill having the first denomination and a second fitness level, corresponding to a fit condition in the first fitness type, to a second output destination, and discharge each currency bill having a first denomination and a third fitness level, corresponding to an unfit condition in the first fitness type, to a third output destination, wherein the plurality of pre-defined fitness levels comprises a plurality of fit levels for a particular fitness type and an unfit level, wherein the fitness reading device and the denomination reading device are different reading devices.

26. A currency processing device according to claim 25, wherein said fitness reading device comprises any least one of a limpness detector, a thickness detector, a soil detector, a tape detector, a hole detector, a tear detector, a staple detector, a graffiti detector, stain detector, and an ink wear detector.

27. A currency processing device according to claim 26, wherein said controller is adapted to discharge each currency bill having a first denomination and a fourth fitness level, corresponding to a fit condition in the first fitness type, to a fourth output destination and to discharge each currency bill having a first denomination and a fifth fitness level, corresponding to a fit condition in the first fitness type, to a fifth output destination.

28. A currency processing device according to claim 26, wherein the controller is adapted to discharge each currency bill having a second denomination and a first fitness level, corresponding to a fit condition in a first fitness type, to the first output destination, to discharge each currency bill having the second denomination and a second fitness level, corresponding to a fit condition in the first fitness type, to the second output destination, and to discharge each currency bill having the second denomination and a third fitness level, corresponding to an unfit condition in the first fitness type, to the third output destination.

29. A currency processing device according to claim 26, wherein said first fitness level for the first fitness type comprises fit bills having a mint fitness, at least as to the first fitness type, wherein said second fitness level comprises currency bills that are fit bills having a fitness category less than a mint fitness, at least as to the first fitness type, and wherein said third fitness level comprises unfit currency bills.

30. A currency processing device, comprising:

an input receptacle adapted to receive input currency bills;

a fitness reading device adapted to retrieve at least a first characteristic information relating to fitness from each of the currency bills;

a denomination reading device adapted to retrieve at least a second characteristic information relating to denomination from each of the currency bills;

a transport mechanism adapted to serially transport the currency bills from the input receptacle to the reading device and then to one of a plurality of output receptacles;

a memory device for storing one of or both of user-definitions and user settings for at least the first characteristic information;

an I/O device configured at least to receive a user input;

a processor adapted to process the first characteristic information retrieved for each of the currency bills by the fitness reading device and to assign to the currency bill a fitness level selected from a plurality of pre-defined fitness levels, the plurality of pre-defined fitness levels comprising a plurality of fit levels for a particular fitness type and the selected fitness level corresponding to the processed first characteristic information; and a controller adapted to discharge each currency bill having a first denomination and a first fitness level, corresponding to a fit condition in a first fitness type, to a first output destination, discharge each currency bill having a second denomination and a first fitness level, corresponding to a fit condition in a first fitness type, to the first output destination, and discharge each currency bill having a third denomination and a first fitness level, corresponding to a fit condition in a first fitness type, to the first output destination, wherein the plurality of pre-defined fitness levels comprises a plurality of fit levels for a particular fitness type and an unfit level, wherein the fitness reading device and the denomination reading device may be the same reading device or may be different reading devices.

31. A currency processing device according to claim 30, wherein said fitness reading device comprises any least one of a limpness detector, a thickness detector, a soil detector, a tape detector, a hole detector, a tear detector, a staple detector, a graffiti detector, stain detector, and an ink wear detector.

* * * * *